US012475494B2

(12) United States Patent
Nahari

(10) Patent No.: US 12,475,494 B2
(45) Date of Patent: Nov. 18, 2025

(54) TRUSTED REMOTE ATTESTATION AGENT (TRAA)

(71) Applicant: PayPal, Inc., San Jose, CA (US)

(72) Inventor: Hadi Nahari, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/211,155

(22) Filed: Jun. 16, 2023

(65) Prior Publication Data

US 2023/0410171 A1 Dec. 21, 2023

Related U.S. Application Data

(63) Continuation of application No. 17/560,937, filed on Dec. 23, 2021, now Pat. No. 11,720,943, which is a
(Continued)

(51) Int. Cl.
*G06Q 30/00* (2023.01)
*G06Q 20/02* (2012.01)
(Continued)

(52) U.S. Cl.
CPC ......... *G06Q 30/0613* (2013.01); *G06Q 20/02* (2013.01); *G06Q 20/32* (2013.01);
(Continued)

(58) Field of Classification Search
CPC .... G06Q 30/0613; G06Q 20/02; G06Q 20/32; G06Q 20/3227; G06Q 20/382;
(Continued)

(56) References Cited

U.S. PATENT DOCUMENTS 5,111,119 A 5/1992 Truskalo et al.
5,229,764 A 7/1993 Matchett et al.
(Continued)

FOREIGN PATENT DOCUMENTS

WO 2007116368 A1 10/2007
WO 2008110791 A2 9/2008
(Continued)

OTHER PUBLICATIONS

"On-Line E-Wallet System with Decentralized Credential Keepers," by Stig Frode Mjolsnes and Chunming Rong, Mobile Networks and Applications 8, 87-99, 2003 (Year: 2003).*
(Continued)

*Primary Examiner* — Anne M Georgalas

(57) ABSTRACT

Systems and methods for use with a service provider and a consumer electronic device include a trusted remote attestation agent (TRAA) configured to perform a set of checking procedures or mechanisms to help ensure the security status of a consumer electronic device (e.g., a mobile terminal or phone) that holds financial instruments. The checking procedures may include: self-verifying integrity by the TRAA; checking for presence of a provisioning SIM card (one that was present when the financial instruments were enabled on the device); checking that a communication connection between the consumer electronic device and the service provider is available and active; and checking that communication connectivity to a home mobile network is available and active. The frequency of the checking mechanisms may be adjusted, for example, according to a risk-profile of a user associated with the device or the location (e.g., GPS location) of the device. The checks may be used, for example, to temporarily disable or limit the use of the financial instruments from the device.

20 Claims, 14 Drawing Sheets

Related U.S. Application Data continuation of application No. 16/836,171, filed on Mar. 31, 2020, now Pat. No. 11,276,093, which is a continuation of application No. 15/677,219, filed on Aug. 15, 2017, now abandoned, which is a continuation of application No. 12/751,733, filed on Mar. 31, 2010, now Pat. No. 9,734,496, which is a continuation-in-part of application No. 12/643,972, filed on Dec. 21, 2009, now abandoned.

(60) Provisional application No. 61/182,623, filed on May 29, 2009.

(51) Int. Cl.
  *G06Q 20/32* (2012.01)
  *G06Q 20/38* (2012.01)
  *G06Q 20/40* (2012.01)
  *G06Q 30/0601* (2023.01)
  *H04L 9/40* (2022.01)
  *H04W 12/00* (2021.01)
  *H04W 12/10* (2021.01)
  *H04W 12/67* (2021.01)

(52) U.S. Cl.
  CPC ....... *G06Q 20/3227* (2013.01); *G06Q 20/382* (2013.01); *G06Q 20/40* (2013.01); *G06Q 20/401* (2013.01); *H04L 63/126* (2013.01); *H04L 63/14* (2013.01); *H04W 12/00* (2013.01); *H04W 12/10* (2013.01); *H04W 12/67* (2021.01)

(58) Field of Classification Search
  CPC .... G06Q 20/40; G06Q 20/401; H04L 63/126; H04L 63/14; H04W 12/00; H04W 12/10; H04W 12/67
  See application file for complete search history.

(56) References Cited

U.S. PATENT DOCUMENTS

| | | | |
|---|---|---|---|
| 5,282,249 A | 1/1994 | Cohen et al. | |
| 5,481,609 A | 1/1996 | Cohen et al. | |
| 5,619,657 A | 4/1997 | Sudama et al. | |
| 6,577,274 B1 | 6/2003 | Bajikar | |
| 6,868,391 B1 | 3/2005 | Hultgren | |
| 6,996,543 B1 | 2/2006 | Coppersmith et al. | |
| 7,039,951 B1 | 5/2006 | Chaudhari et al. | |
| 7,206,938 B2 | 4/2007 | Bender et al. | |
| 7,319,855 B1 | 1/2008 | Brune et al. | |
| 7,382,261 B2 | 6/2008 | Lin et al. | |
| 7,389,917 B2 | 6/2008 | Abraham et al. | |
| 7,450,010 B1* | 11/2008 | Gravelle | H04L 9/3271 340/572.1 |
| 7,532,122 B2 | 5/2009 | Aull et al. | |
| 7,536,722 B1 | 5/2009 | Saltz et al. | |
| 7,591,413 B1* | 9/2009 | Block | G07F 19/20 235/379 |
| 7,596,701 B2 | 9/2009 | Varghese et al. | |
| 7,677,438 B2 | 3/2010 | DeJean et al. | |
| 7,752,135 B2* | 7/2010 | Brown | G06Q 20/04 705/44 |
| 7,942,321 B2 | 5/2011 | Linton et al. | |
| 8,020,005 B2 | 9/2011 | Mani et al. | |
| 8,060,389 B2 | 11/2011 | Johnson | |
| 8,086,497 B1 | 12/2011 | Oakes, III | |
| 8,112,785 B1 | 2/2012 | Cooley et al. | |
| 8,123,124 B2 | 2/2012 | Salazar et al. | |
| 8,310,346 B2 | 11/2012 | Burbridge et al. | |
| 8,342,407 B2 | 1/2013 | Williams et al. | |
| 8,355,711 B2* | 1/2013 | Heins | H04M 3/4872 455/418 |
| 8,370,639 B2 | 2/2013 | Azar et al. | |
| 8,423,466 B2 | 4/2013 | Lanc | |
| 8,424,061 B2 | 4/2013 | Rosenoer | |
| 8,634,559 B2 | 1/2014 | Brown et al. | |
| 8,645,227 B2 | 2/2014 | Owen | |
| 8,655,310 B1 | 2/2014 | Katzer et al. | |
| 8,825,073 B1* | 9/2014 | Zettner | G06Q 20/3224 455/456.2 |
| 8,839,388 B2 | 9/2014 | Raleigh | |
| 8,961,619 B2 | 2/2015 | Gum | |
| 2002/0128932 A1 | 9/2002 | Yung et al. | |
| 2002/0143634 A1 | 10/2002 | Kumar et al. | |
| 2003/0014315 A1 | 1/2003 | Jaalinoja et al. | |
| 2003/0014316 A1 | 1/2003 | Pratt et al. | |
| 2003/0115151 A1 | 6/2003 | Wheeler et al. | |
| 2003/0220876 A1 | 11/2003 | Burger et al. | |
| 2004/0123156 A1 | 6/2004 | Hammond, II et al. | |
| 2004/0230489 A1 | 11/2004 | Goldthwaite et al. | |
| 2004/0242209 A1 | 12/2004 | Kruis et al. | |
| 2005/0008148 A1 | 1/2005 | Jacobson | |
| 2005/0010786 A1 | 1/2005 | Michener et al. | |
| 2005/0069135 A1* | 3/2005 | Brickell | H04L 9/3221 380/277 |
| 2005/0187873 A1* | 8/2005 | Labrou | G06Q 20/326 705/40 |
| 2005/0246292 A1 | 11/2005 | Sarcanin | |
| 2005/0274793 A1 | 12/2005 | Cantini et al. | |
| 2005/0289061 A1 | 12/2005 | Kulakowski et al. | |
| 2006/0000892 A1 | 1/2006 | Bonalle et al. | |
| 2006/0014532 A1* | 1/2006 | Seligmann | G06F 21/6218 455/420 |
| 2006/0080727 A1 | 4/2006 | Hammons et al. | |
| 2006/0149632 A1 | 7/2006 | Register et al. | |
| 2006/0149635 A1 | 7/2006 | Bhatti et al. | |
| 2006/0161772 A1* | 7/2006 | Talstra | H04L 9/3273 713/168 |
| 2006/0165060 A1 | 7/2006 | Dua | |
| 2006/0224470 A1 | 10/2006 | Garcia Ruano et al. | |
| 2006/0258397 A1 | 11/2006 | Kaplan et al. | |
| 2006/0280339 A1 | 12/2006 | Cho | |
| 2006/0287004 A1 | 12/2006 | Fuqua | |
| 2006/0287963 A1 | 12/2006 | Steeves et al. | |
| 2007/0027806 A1 | 2/2007 | Sands et al. | |
| 2007/0061590 A1 | 3/2007 | Boye et al. | |
| 2007/0106892 A1 | 5/2007 | Engberg | |
| 2007/0108269 A1 | 5/2007 | Benco et al. | |
| 2007/0198264 A1 | 8/2007 | Chang | |
| 2007/0236330 A1 | 10/2007 | Cho et al. | |
| 2007/0244811 A1 | 10/2007 | Tumminaro | |
| 2008/0010190 A1* | 1/2008 | Rackley, III | G06Q 20/3223 705/39 |
| 2008/0015994 A1 | 1/2008 | Bonalle et al. | |
| 2008/0033880 A1 | 2/2008 | Fiebiger et al. | |
| 2008/0034224 A1 | 2/2008 | Ferren et al. | |
| 2008/0082828 A1 | 4/2008 | Jennings et al. | |
| 2008/0103972 A1* | 5/2008 | Lanc | G06Q 20/405 705/44 |
| 2008/0109899 A1 | 5/2008 | Van Rijnswou et al. | |
| 2008/0127319 A1 | 5/2008 | Galloway et al. | |
| 2008/0141033 A1 | 6/2008 | Ginter et al. | |
| 2008/0222048 A1 | 9/2008 | Higgins et al. | |
| 2008/0238610 A1 | 10/2008 | Rosenberg | |
| 2008/0244271 A1 | 10/2008 | Yu | |
| 2008/0244277 A1 | 10/2008 | Orsini et al. | |
| 2008/0255993 A1 | 10/2008 | Blinbaum | |
| 2008/0294563 A1 | 11/2008 | Boutahar et al. | |
| 2008/0306872 A1 | 12/2008 | Felsher | |
| 2009/0005351 A1 | 1/2009 | Pickar et al. | |
| 2009/0006861 A1 | 1/2009 | Bemmel | |
| 2009/0006920 A1 | 1/2009 | Munson et al. | |
| 2009/0030778 A1 | 1/2009 | Zapata et al. | |
| 2009/0030843 A1 | 1/2009 | Hoffman et al. | |
| 2009/0061839 A1* | 3/2009 | Zimmerman | H04W 8/265 455/419 |
| 2009/0070272 A1* | 3/2009 | Jain | G06Q 40/00 705/35 |
| 2009/0099951 A1 | 4/2009 | Pandurangan | |
| 2009/0099961 A1 | 4/2009 | Ogilvy | |
| 2009/0125323 A1 | 5/2009 | Lakshmanan et al. | |

(56) References Cited

U.S. PATENT DOCUMENTS

| | | | |
|---|---|---|---|
| 2009/0132392 A1 | 5/2009 | Davis et al. | |
| 2009/0164371 A1* | 6/2009 | Arroyo | G06Q 20/326 705/42 |
| 2009/0228365 A1 | 9/2009 | Tomchek et al. | |
| 2009/0241172 A1 | 9/2009 | Sennett et al. | |
| 2009/0282259 A1 | 11/2009 | Skoric et al. | |
| 2009/0307139 A1 | 12/2009 | Mardikar et al. | |
| 2009/0307140 A1* | 12/2009 | Mardikar | G07F 7/0826 705/17 |
| 2010/0022254 A1 | 1/2010 | Ashfield et al. | |
| 2010/0031022 A1 | 2/2010 | Kramer | |
| 2010/0069056 A1* | 3/2010 | Pope | H04M 1/7246 705/26.1 |
| 2010/0082484 A1 | 4/2010 | Erhart et al. | |
| 2010/0115610 A1 | 5/2010 | Tredoux et al. | |
| 2010/0131415 A1 | 5/2010 | Sartipi | |
| 2010/0174915 A1* | 7/2010 | Prokin | G06Q 40/02 713/189 |
| 2010/0180127 A1 | 7/2010 | Li et al. | |
| 2010/0269166 A1 | 10/2010 | Awad et al. | |
| 2010/0306076 A1 | 12/2010 | Taveau et al. | |
| 2010/0306819 A1 | 12/2010 | Nahari et al. | |
| 2010/0320266 A1 | 12/2010 | White | |
| 2011/0016534 A1 | 1/2011 | Jakobsson et al. | |
| 2011/0066523 A1 | 3/2011 | Harrison, Jr. | |
| 2011/0202982 A1 | 8/2011 | Alexander et al. | |
| 2011/0247058 A1 | 10/2011 | Kisters | |
| 2012/0016731 A1 | 1/2012 | Smith et al. | |
| 2013/0124405 A1 | 5/2013 | Hamzeh | |

FOREIGN PATENT DOCUMENTS

| | | |
|---|---|---|
| WO | 2009097215 A1 | 8/2009 |
| WO | 2009158420 A1 | 12/2009 |
| WO | 2010138358 A1 | 12/2010 |
| WO | 2010138359 A1 | 12/2010 |
| WO | 2010138611 A1 | 12/2010 |
| WO | 2010138613 A1 | 12/2010 |
| WO | 2010138615 A1 | 12/2010 |
| WO | 2011137082 A1 | 11/2011 |

OTHER PUBLICATIONS

"Mobile Momentum," by Stephen Timewell, The Banker: 1, The Financial Times Limited (Jun. 2007) (Year: 2007).*

"Payments and Banking with Mobile Personal Devices," by Amir Herzberg, Communications of the ACM, vol. 46, No. 5 (May 2003) (Year: 2003).*

"New Mobile Phone Technology from Secure Identity Systems Stops Card Fraud Cold," Business Wire, Mar. 5, 2008 (Year: 2008).*

"Security of a Moble Transaction: A Trust Model," by Santosh K. Misra and Nilmini Wickamasinghe, Electronic Commerce Research 4, 4: 359-372, Springer Nature BV (Oct. 2004) (Year: 2004).*

Anonymous., "Mobey Forum: Research Lays Groundwork for Global Mobile Financial Services Standards; New Business Models Consider Needs of All Key Players When Sharing Secure Hardware," M2 Presswire, Jun. 17, 2008, 3 pages.

BusinessWire., "VIVOtech Deploys Industry's First Integrated NFC Payment and Promotion Solution for Mastercard(R) PayPass(TM) Mobile Phone Payment Trial with Taipei Fubon Bank and Taiwan Mobile," Feb. 7, 2007, 3 pages.

European Appl. No. 10781146.5, Extended European Search Report mailed Apr. 25, 2014, 14 pages.

"Ford Offers Security Features to Protect Owners' Personal Information as Cars, Internet Converge", PR Newswire, Mar. 8, 2010, 3 pages.

"Greg's diary", Aug. 2009, Retrieved from the Internet: URL: http://www.lemis.com/grog/diary-aug2009.php?dirdate=20090807&imagesizes=11111111111111111113#Photo-19, 78 Pages.

International Appl. No. PCT/US2009/048490, United States Patent and Trademark Office as the International Searching Authority, International Search Report dated Jul. 31, 2009, 2 pages.

International Appl. No. PCT/US2010/035462, International Search Report and Written Opinion dated Jul. 13, 2010, 8 pages.

International Appl. No. PCT/US2010/035465, International Search Report and Written Opinion dated Jul. 13, 2010, 6 pages.

International Appl. No. PCT/US2010/036229, International Search Report and Written Opinion dated Jul. 28, 2010, 11 pages.

International Appl. No. PCT/US2010/036231, International Search Report and Written Opinion dated Nov. 8, 2010, 7 pages.

International Appl. No. PCT/US2010/036233, International Search Report and Written Opinion dated Jul. 28, 2010, 6 pages.

International Appl. No. PCT/US2011/033828, International Search Report and Written Opinion dated Jul. 12, 2011, 10 pages.

Mallat N. et al., "Exploring merchant adoption of mobile payment systems: An empirical Study," E-Service Journal, 2008, vol. 6, No. 2, 21 pages, Retrieved from the Internet: URL: http://search.proquest.com/docview/194892719?accountid=14753.

Santosh M.K., et al., "Security of a Mobile Transaction: A Trust Model," Electronic Commerce Research, vol. 4.4, Springer Nature B.V., Oct. 2004, 12 pages.

"Trusted Computing Platform Alliance (TCPA) Main Specification Version 1.1b", Trusted Computing Group, Beaverton, OR, Feb. 22, 2002, 332 Pages.

Wolf D., "System Verifies Transactions by Phone's Location," American Banker 173.44:5, SourceMedia, Inc., Mar. 5, 2008, 3 pages.

* cited by examiner

IPD Visual Indicator

TRUSTED REMOTE ATTESTATION AGENT (TRAA)

CROSS REFERENCE TO RELATED APPLICATIONS

This application is a continuation of U.S. patent application Ser. No. 17/560,937, filed Dec. 23, 2021, which is a continuation of U.S. patent application Ser. No. 16/836,171 filed on Mar. 31, 2020, which is a continuation of U.S. patent application Ser. No. 15/677,219, filed Aug. 15, 2017, which is a continuation of U.S. patent application Ser. No. 12/751,733, filed Mar. 31, 2010, now U.S. Pat. No. 9,734,496, which is a continuation-in-part of U.S. patent application Ser. No. 12/643,972, filed Dec. 21, 2009, which claims the benefit of U.S. Provisional Application No. 61/182,623, filed May 29, 2009; the disclosures of each of the applications identified above are incorporated by reference herein in their entireties.

BACKGROUND

Technical Field

Embodiments of the present invention generally relate to secure financial transactions initiated from an electronic device and, more particularly, to the ability to use the phone or other wireless communication function (e.g., of a mobile handset or consumer electronic device) to feed data back to a Trusted Integrity Manager as part of a Mobile Embedded Payment program in the financial industry to authenticate users (e.g., a consumer).

Related Art

In direct (face-to-face) or online financial transactions customers may search for and purchase products and/or services from a merchant. In the case of online shopping, transactions are conducted through electronic communications with online merchants ova electronic networks. A variety of electronic devices and various electronic techniques may be used to conduct such electronic transactions. Methods of initiating or making financial transactions from an electronic device include, for example, SMS (Short Message Service), radio frequency identification (RFID) or near field communication (NFC) at a point-of-sale (POS), and mobile Internet-based payments, by which customers search for and purchase products and services through electronic communications with online merchants over electronic networks such as the Internet. Such electronic transactions may be conducted via wireless communication, also referred to as "over-the-air" (OTA) communication—which may include ordinary (e.g., longer distance) radio frequency (RF) communication; mid-range communication such as Wi-Fi or Bluetooth; or short-range RFID or NFC, for communication over a distance that is typically less than about 4 inches). Such transactions may be conducted, for example, with a cell phone using the cell phone's normal RF communication or using NFC if the cell phone is NFC-enabled. Other mobile devices, in addition to cell phones, that may provide OTA communication for facilitating such transactions may include, for example, radio frequency-enabled credit and debit cards, key fobs, mobile Internet devices, consumer electronics (not limited to, but as an example, a contactless and proximity enabled personal computer (PC) or laptop) and contactless and proximity enabled personal digital assistants (PDA).

When registering a mobile device or conducting a financial transaction via any kind of consumer electronic device (CED), security is generally an issue in that data transferred wirelessly may typically include credit card and financial instrument information such as a user name, account number, a PIN, and a password, for example, that are susceptible to theft or malicious attack. In addition, a number of parties may be involved in the transaction including, for example, a customer or user, a merchant, a mobile network operator (MNO), a service provider (SP), a trusted service manager (TSM), a mobile phone manufacturer, an integrated chip (IC) manufacturer, and application (software) developers. Another central issue with consumer electronic devices—such as a personal computer (PC), a laptop, mobile phone, NFC enabled mobile device, for example, or other CEDs—is the need for cooperation between the many involved parties, in addition to financial institutions, to meet the needs of the customer via a secure over-the-air link.

SUMMARY

According to one or more embodiments of the present invention, a mobile embedded payment (MEP)system operated, for example, by a financial service provider (FSP) in the financial industry includes a Trusted Integrity Manager (TIM)—which may also be referred to as a Trusted Authentication Provider (TAP)—as part of, or functioning in conjunction with, a Trusted Service Manager (TSM). TIM enables the ability to use the phone function of a mobile handheld device to feed data (including, e.g., time and geo-location) back to the TIM to authenticate users in the context, for example, of financial transactions. TIM works with TSM, which may be loosely described as a primitive key management system. TIM provides additional security, especially with payment applications. TIM includes many different sub-systems, and modules and components within the sub-systems. TIM works with the TSM to provide additional security between entities (e.g., mobile device, payment provider, financial institution) in secure transactions.

In one embodiment, TIM is added to a TSM that manages financial-related communication between carriers, consumers, retailers, and financial institutions. Conventional TSM has only a Trusted Service Provider (TSP) and a Trusted Third Party (TTP) component. TSP functions include select and validate, manage, and monetize applications. TTP functions include SIM (Subscriber Identity Module) issuing, OTA personalization, and life cycle management of the hardware(e.g., for SIM software). The functions of the TIM include performing various service processes which may include, for example, validating, provisioning via TTP, authorizing, and re-issuing various pieces of information inside a mobile device (also referred to as mobile handset but not limited only to handsets) of a consumer or user. The TIM also manages and makes sure the data for validation of a transaction are handled securely from a remote location (TSM in itself may be like a large central remote processor of electronic data, payment or non payment). By coupling the TIM function, acting as a server in a conventional client-server architecture, in the TSM and an embedded secure element (eSE) acting as a client—implementations of various embodiments may rely, for example, on eSE, Secure Memory Card, or Universal Integrated Circuit Card (UICC)—inside the handset, a new level of verification and security is added.

Initially, the TTP provides a SIM key(s) to a carrier. The carrier then activates the service with a user when a user purchases a handset and the service. This is a usual activation. Through an application (also referred to as "app") on the handset—which may be purchased and downloaded, for example, via an application store such as App Store™, a trademark of Apple, Inc.—the user requests enablement of payment functions on his or her handset. In order to achieve a higher level of security, a payment secure element, SE, embedded with the RF chip (or working in conjunction with the RF chip) serves as a repository of all financial critical data inside the handset. The application downloaded is to be verified by the TSM/TSP prior to being downloaded. When downloaded over the air (OTA), the application is installed in the proper SE and memory area by the TTP. Additionally a logical switch is activated to turn on the payment SE and link it to the SIM for User/IMEI (International Mobile Equipment Identification) parameters binding. Data for validation is to be sent back to the TIM to create a profile. The mobile device becomes effectively a payment device with security parameters stronger than existing models. The payment engine is contained in the embedded SE, while non-critical or properly authorized applications reside in the SIM card.

A second step—e.g., after provisioning of a SIM card and enablement of payment functions, at which juncture the SIM card is then referred to as the "provisioning SIM"—is provisioning of a payment instrument. The user requests his/her payment card to be installed on the phone, i.e., handset or device. Since the device is mobile, the original request goes to the TSP (which can be through a specific bank wallet for example). The TSP then requests validation, verification, and authorization that the specific instrument that has been requested is a legitimate instrument for that user. When the authorization from the bank is received by the TSM, the information is sent to the TIM to be validated and packaged in the proper format for the handset and to be understood by the embedded SE payment engine, e.g., a Mobile Embedded Payment (MEP) client.

The TIM then passes the "package" to be installed into the embedded SE to the UP who will OTA install the "package" on the handset. At no time is the TTP aware of the encryption or keys used. Within the payment engine, e.g., embedded SE, all the payment instruments are to be validated by the TIM to be executed on the handset, and their integrity is to be checked on a regular basis against the TIM knowledge. Furthermore, some data linked to the user and handset could be used by the TIM to verify identity or authorization credentials on transactions in a regular acquiring process that is beyond what is done in the prior art. This includes, but not limited to, feeding back time and geo-location data from the device to the TIM to cross reference merchant ID (strong non-repudiation), user ID (strong user protection) and device ID (strong integrity of payment instruments used for banks) as well as location and time of a transaction. Geo-location could be important for user protection to make sure the user and device binding known by the TIM does match with the merchant acceptance device (known location in financial network) and the handset used for the payment (e.g., same city, same country).

In another embodiment, a consumer electronic device—for example but not limited to: a personal computer (PC), a laptop, a mobile phone, an NFC-enabled mobile device, a NetTop or NetTV—determines whether a proper SIM card (or UICC, for example, or other uniquely identifiable available network communication element appropriate to the device) is present, whether a connection to the mobile network operator is present, whether data has been changed in the device's embedded SE, and whether an actual SIM card is present. Based on these conditions, the user is allowed, e.g., by a Trusted Remote Attestation Agent (TRAA), specific use of the device for NFC payments, for example, or other OTA or wirelessly conducted transactions. More specifically, for example, an NFC-enabled mobile device may have TRAA software running on an embedded SE in the device. The embedded SE is in communication with the device SIM card. The TRAA software runs to check whether data in the secure element has been changed. If so, and there has been no confirmation from the TSM or TIM through the mobile network, the device is locked and cannot be used until confirmation of the change can be made, such as through the TSM or a call to the FSP. TRAA also checks whether the SIM card present is actually the SIM card used to provision the phone (the provisioning SIM), such as by matching the SIM card unique ID with what is expected. If the SIM card is not the provisioning SIM or if a SIM card is not present, the device is held until the provisioning SIM is available. The TRAA also checks whether there is a connection to the network and TSM. Such a situation may arise, for example, when the device is in a foreign country, underground, or in a tunnel. If the provisioning SIM is not available, a predetermined transaction cap is imposed, such as $50, and transactions more than the predetermined transaction cap (or a total amount) are denied until the network becomes available again for communication with the TSM. This conditional denial reduces risk of fraudulent purchases.

In one embodiment, a system for use with a service provider and a consumer electronic device includes an agent module configured to perform a set of checking mechanisms to ensure that a communication connection between the consumer electronic device and the service provider is available and active, for which the frequency of the checking mechanisms may be adjusted by the system. In another embodiment, a method for use with a consumer electronic device and a service provider includes steps of: determining whether a SIM card is present on the consumer electronic device; determining whether a data in a secure element of the consumer electronic device has changed; determining, if the SIM card is present, whether a network connection to the service provider is available; and enforcing a predetermined restriction on the consumer electronic device if either the SIM card is not present or the data in the secure element has changed and there is no confirmation from the service provider through the network connection.

In a further embodiment, a computer program product includes a computer readable medium having computer readable code for instructing a processor of a device to perform a method, the method including: self-verifying integrity of the computer readable code; checking for presence of a provisioning SIM card present when the device is provisioned with a financial instrument; checking for connectivity to a financial service provider (FSP); checking for connectivity to a trusted service manager (TSM) via a home mobile network; if the self-verification fails, putting a financial instrument on the device in a lock state so that the financial instrument is required to be re-enabled by calling the service provider; if it has been determined that a SIM card is present, verifying whether the SIM card matches the provisioning SIM card; if the verification of the provisioning SIM card fails, putting the financial instrument on a hold state so that the financial instrument will become available for use once the provisioning SIM card is again present in the device; and if checking for connectivity to the FSP fails and checking for connectivity to the TSM fails, putting the financial instrument on a cap state, wherein financial transactions for more than a predetermined cap value are denied to the device.

DETAILED DESCRIPTION

Figure 1:
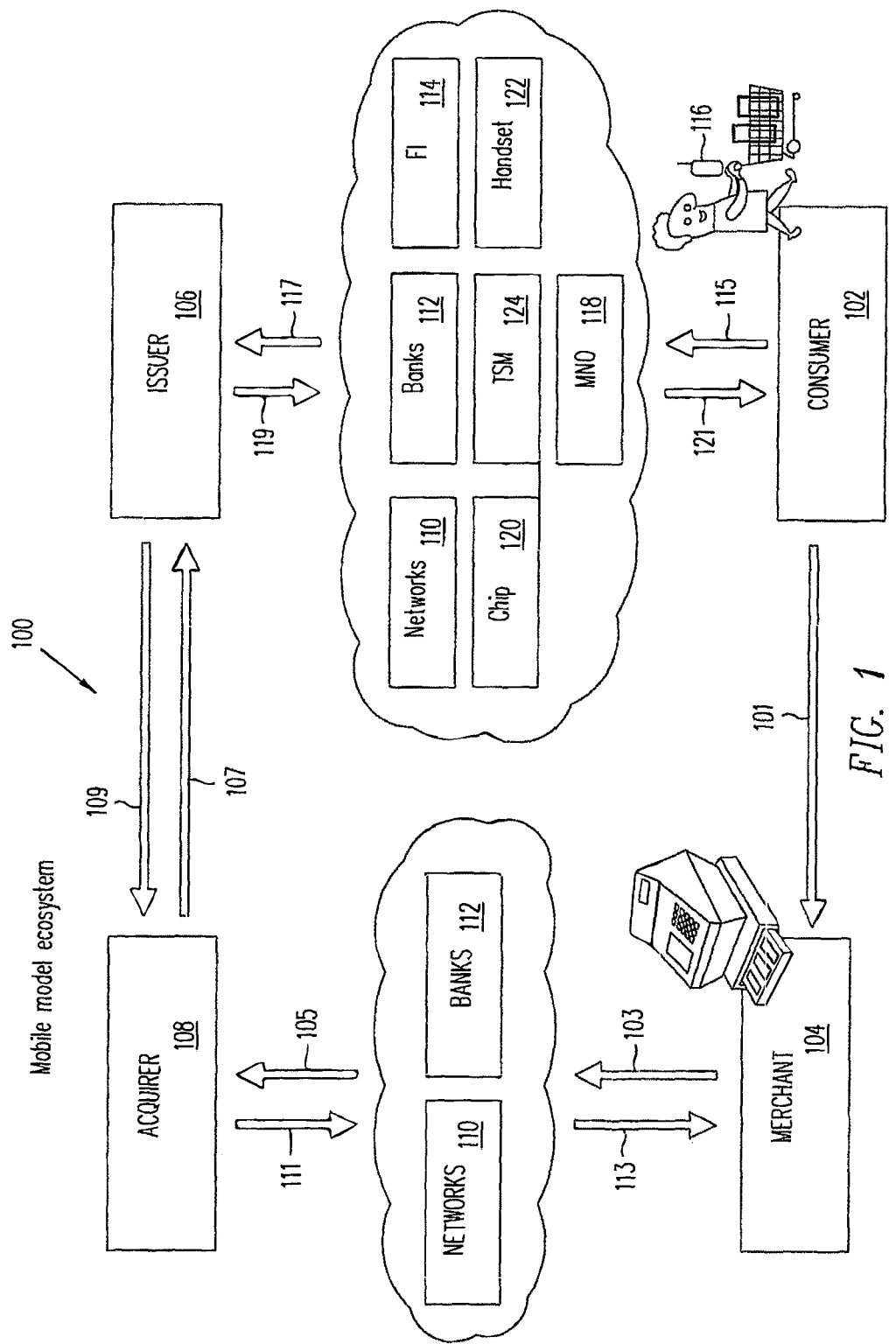
FIG. 1 is a system diagram illustrating an ecosystem for financial transactions using a mobile phone function in accordance with an embodiment of the present invention.

Embodiments of the present invention relate to mobile embedded payment (MEP) systems and methods for providing secure financial transactions over a network using a Trusted Service Manager. In one embodiment, a Trusted Integrity Manager (TIM)—which may also be referred to as a Trusted Authentication Provider (TAP)—is provided in addition to a Trusted Service Manager (TSM) that manages financial-related communication between carriers, consumers, retailers, and financial institutions. The TIM (acting, e.g., as MEP system server and providing various service processes) and the ability to use the phone function (acting, e.g., as MEP client) to feed data back to the TIM are novel concepts in the financial industry. By coupling the TIM server functions to an embedded secure element (eSE) client inside the handset, a new level of verification and security may be introduced into the financial industry.

The functioning of the TIM may be considered the "trust foundation" of the TSM and enables a financial service provider (FSP).—such as PayPal, Inc.—to provide provisioning services but also to operate an authentication service. TIM provides key pieces, for example, of the "remote" communications involved in using near-field communications (NFC) and other wireless or OTA communications for transactions, enabling applications to be trusted, and removal of liability associated with trusted application execution on user handsets, by strongly binding the user, the account and payment instrument, the value instrument, e.g., coupon or ticket, and the device to a central trusted and liable back-end entity. Another function of the TIM is similar to a key management authority (KMA) or controlling authority (CA).

The MEP system may include a back-end infrastructure and various business services. For example, one business service may include an on-card fingerprint authentication that operates using a fingerprint digital image stored or processed in the eSE vault of the FSP. The eSE vault may be located on the user's mobile handset, for example. A specific cryptographic authentication protocol may be used to make sure the "live reading" (e.g., real-time processing) of the fingerprint is properly matched with a tagged stored image on the chip, e.g., IC chip used to implement the eSE. The processing includes a dual real-time matching that is novel compared to the way on-chip fingerprint authentication is typically performed.

Also, for example, another business service may include an authentication service that incorporates the possibility of leveraging geo-location information from the handset, fingerprint strong authentication, device marking, timestamp, and other types of data that may be considered raw data. Some of these types of data may be provided, for example, by the carrier (e.g., mobile network operator). The batch of raw data may be used to provide an additional tool of risk assessment to issuing banks in addition to the usual transaction data the issuing banks received via the acquiring network. From the batch of data, the FSP may control the level of risk to be tolerated and fine tune the risk associated with the use, for example, of the NFC-enabled mobile phone or other wireless or OTA-communicating devices.

For example, if the phone is offline, the FSP could implement a parameter in the eSE to limit spending to a pre-determined dollar amount per day before requiring a forced (e.g., mandatory or prerequisite to further spending) access to the network. The parameter may also allow having a counter-reset in the eSE in compliance with EMV requirements (EMV is a standard for interoperation of IC chip cards, the letters EMV being taken from Europay-Mastercard-Visa). This capacity to work offline may be enabled by profiling of user, device, and transaction. Having a smart counter associated with the MEP client may allow managing of various parameters to authorize or decline a transaction without going back to the FSP cloud (see, e.g., FIG. 5). Such parameters may include, for example, a cash reserve, preset, or prepaid dollar amount on the user mobile device linked to the back-end FSP balance (but not allowed to exceed the balance); a number of transactions authorized; or a dollar amount limit—such as $100 a day with a request to connect back to the FSP cloud, when getting close to the limit, for verification and updating of the profile parameters. The smart counter may also include the capacity to keep a history log of the offline transactions to update the FSP cloud when connecting back.

Returning to the raw data provided for the authentication service, if the user desires to skip the fingerprint, the FSP could, for example, attach a higher risk to the transaction or require the input of a fingerprint for transactions above a certain threshold related to the parameters. In the case, for example, of P2P (point-to-point) NFC for classified transactions, the authentication service may allow the FSP to send over the air (OTA) a pre-verified certificate both for the vendor and the buyer, providing a cashless transaction with trusted payment. At the same time the buyer provides the pre-paid certificate to the seller, the seller will be informed that payment was completed and the buyer will receive a certificate from the seller that indeed the payment was received and the goods released. In that instance, the FSP may provide real-time micro escrow for both parties.

FIG. 1 is a system diagram illustrating an ecosystem 100 for financial transactions using a mobile phone function. FIG. 1 shows a variance of the traditional "4-corners model" adapted to reflect the specificities of the mobile ecosystem 100. FIG. 1 shows information and monetary or credit flows 101, 103, 105, 107, 109, 111 that may take place between various entities (e.g., 102, 104) in support of or in consequence of a financial transaction between a consumer 102 and a merchant 104 in the case that an issuer 106 (e.g., credit card company or bank) and an acquirer 108 (e.g., a part of a bank that receives and pays out funds as opposed to the part that issues credit, the issuer) are involved. As shown in FIG. 1, flows 103, 105, 111, 113 between merchant 104 and acquirer 108 may involve communications and transactions flowing through networks 110 and banks 112. Similarly, as seen in FIG. 1, flows 115, 117, 119, 121 between consumer 102 and issuer 106 may involve communications and transactions flowing through networks 110, banks 112, and financial institutions (FI) 114. When additional functionality for using a mobile handset 116 to facilitate a transaction is provided in accordance with one or more embodiments of the present invention, however, flows 115, 117, 119, 121 between consumer 102 and issuer 106 may involve communications and transactions that involve additional entities. Examples of such additional entities, as seen in FIG. 1, include mobile network operators (MNO) 118, manufacturers of integrated circuit chips (Chip) 120, manufacturers and providers of mobile handsets (Handset) 122, and trusted service managers (TSM) 124 as defined by the GSMA (Global System for Mobile Association). Thus, there is a need to coordinate various security and trusted management functions among the entities involved, including the additional entities.

Figure 2:
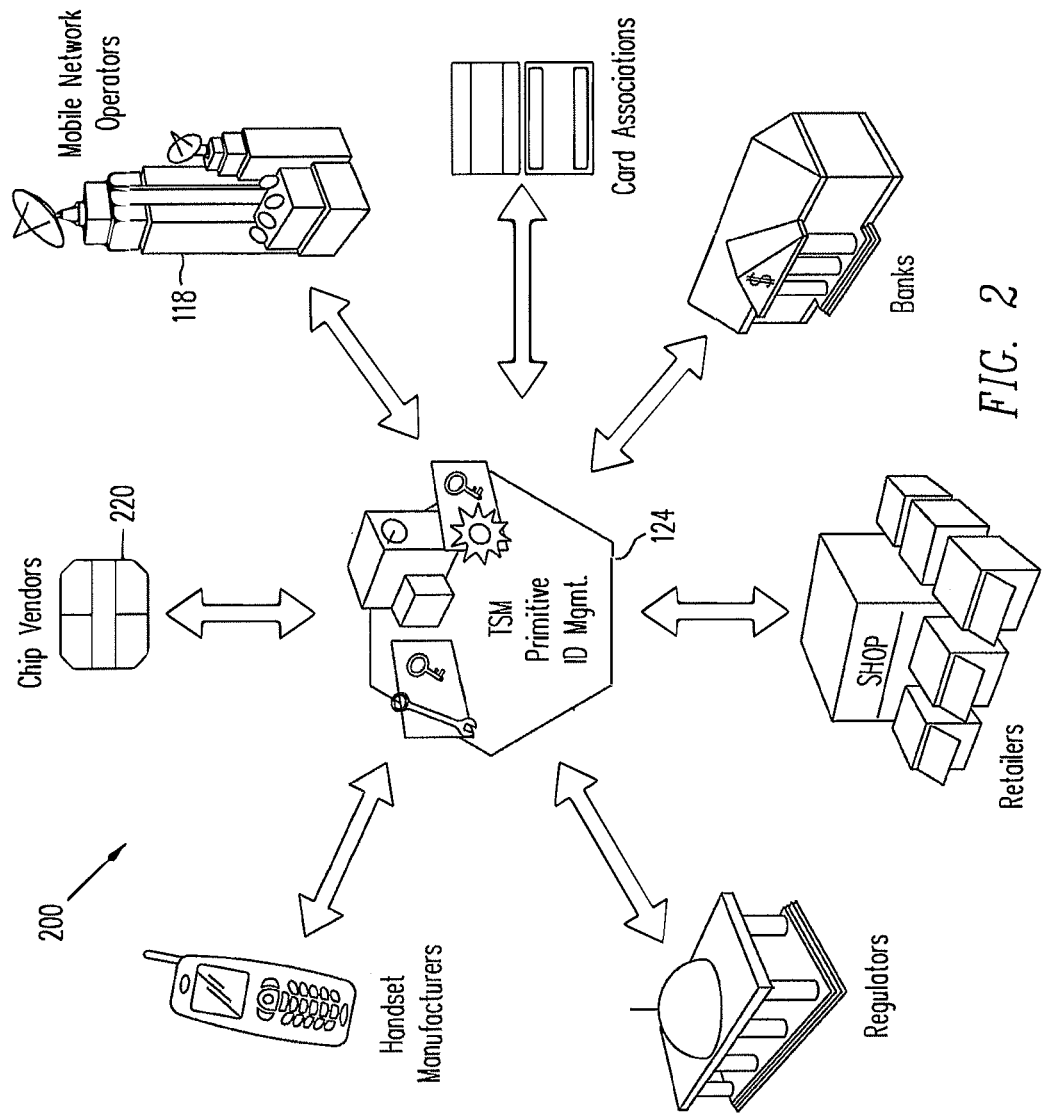
FIG. 2 is a system diagram illustrating a portion of the ecosystem of FIG. 1 relative to a Trusted Service Manager (TSM) in accordance with an embodiment.

FIG. 2 is a system diagram illustrating a portion 200 of the ecosystem 100 of FIG. 1 relative to a Trusted Service Manager 124. FIG. 2 is illustrative of the variety of entities that a TSM 124 may interface with and perform services related to. As seen in FIG. 2, there may be many parties in the ecosystem 100. For purposes of security and secure communications, it may be assumed that none trusts (nor should trust) the others. Many of the TSM functions may be defined by integrated circuit chip vendors 220 (e.g., providers of integrated circuits for handsets and reading devices) and mobile carriers (e.g., mobile network operators 118). Services provided by such functions may be low level in the sense that the services relate more to functioning of the hardware than facilitation of financial transactions. Thus, one or more embodiments may provide functions and services additional to those provided by a TSM 124. Such services may relate, for example, to security, trust management, and shifting of liability.

Figure 3:
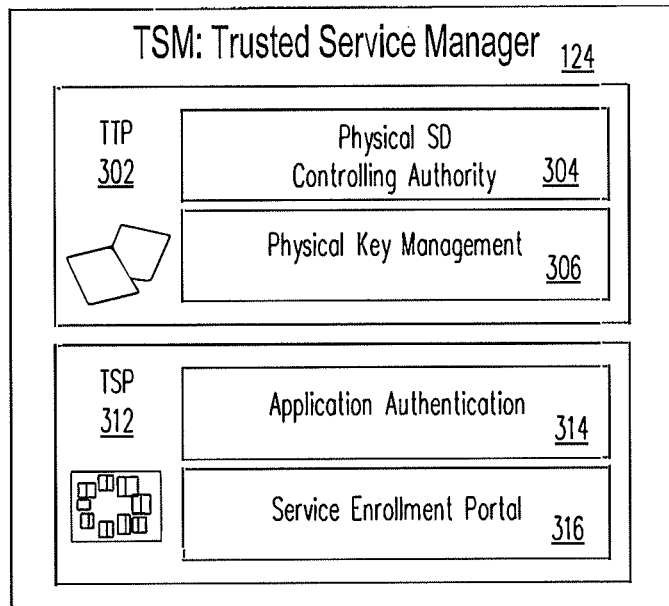
FIG. 3 is a system block diagram illustrating TSM components in accordance with an embodiment.

FIG. 3 is a system block diagram illustrating some components of a TSM, e.g., TSM 124. Trusted Third Party (TTP) 302 may only manage the physical aspects of the secure element (SE, see, e.g., FIGS. 4B, 5) such as key management authority (KMA), memory allocation, pre- or post-provisioning, and OTA conduits, for example. Thus, for example, TTP 302 may provide a physical SD (Secure Domain; a secure memory card such as a TrustedFlash card) controlling authority 304 and physical key management 306.

Trusted Service Provider (TSP) 312 may only manage SE-related services such as validation, service authentication, and application execution on or from the SE. For example, TSP 312 may provide an application authentication 314 service and a service enrollment portal 316.

Figure 4A:
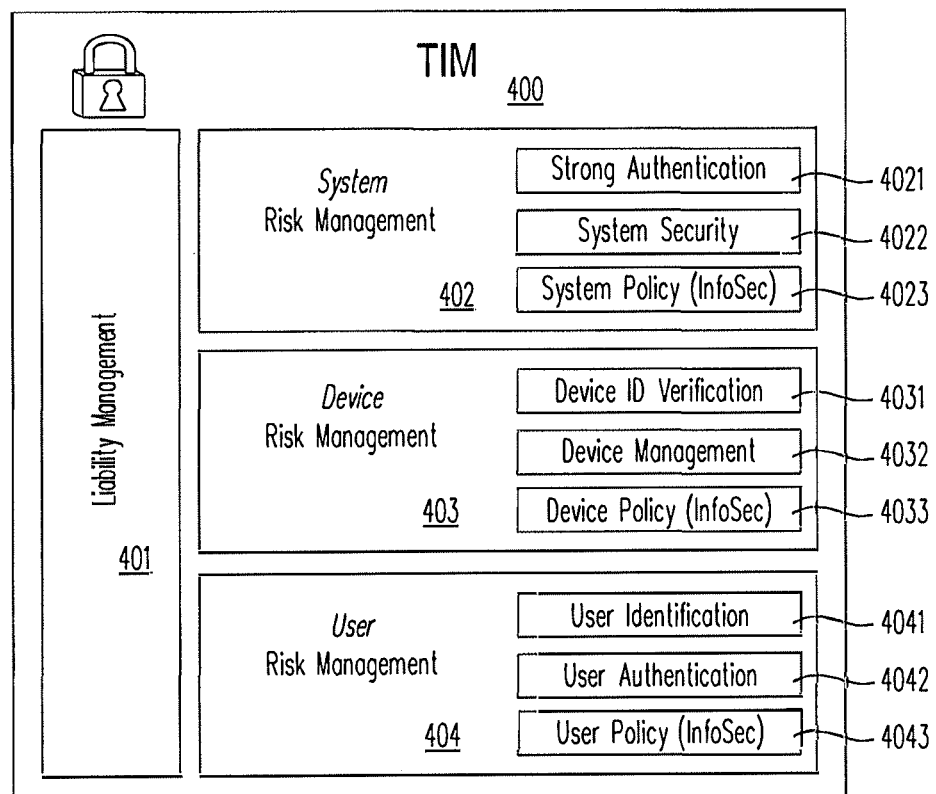
FIG. 4A is a functional block diagram illustrating an example of system level functions of a Trusted Integrity Manager (TIM) in accordance with an embodiment.

FIG. 4A is a functional block diagram illustrating an example of functions that may be performed by a trusted integrity manager (TIM) 400 as part of a mobile embedded payment (MEP) system. TIM 400 may provide liability management 401 in addition with other services including system risk management 402, device risk management 403, and user risk management 404. System risk management 402 may include, for example, strong authentication 4021, system security 4022, and system policy 4023 (with regard to information security, also referred to as InfoSec). Device risk management 403 may include, for example, device ID verification 4031, device management 4032, and device policy 4033 (with regard to InfoSec). User risk management 404 may include user identification 4041, user authentication 4042, and user policy 4043 (with regard to InfoSec).

Figure 4B:
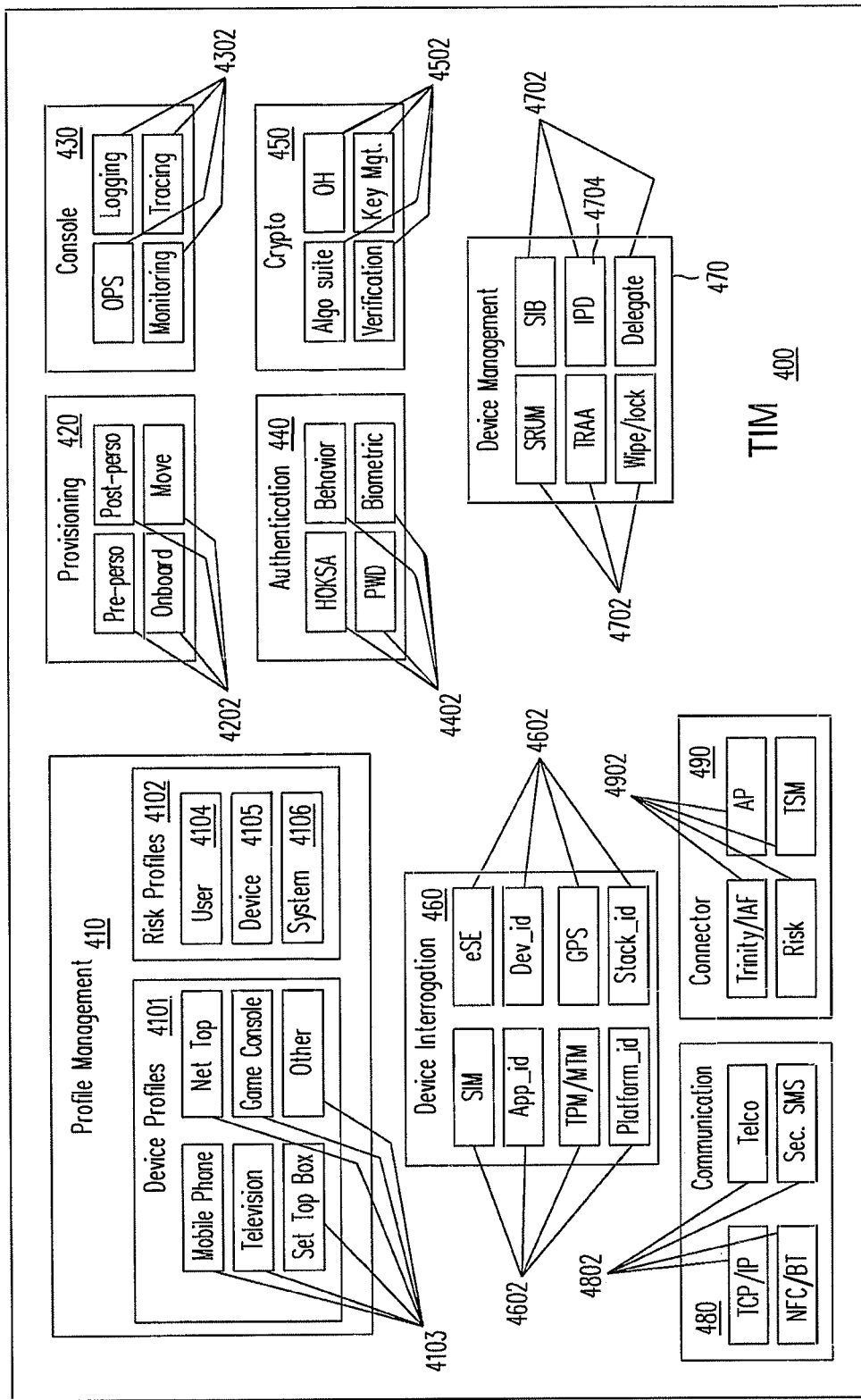
FIG. 4B is a system block diagram illustrating an example of TIM subsystems and organization in accordance with an embodiment.

FIG. 4B is a system block diagram illustrating an example of TIM 400 subsystems and organization. As shown in FIG. 4B, TIM 400 may include a number of modules 410 through 490 for performing various functions and service processes. A service process may be any process which facilitates performing a service, and may include, for example, processes that facilitate performing the functions described with reference to FIG. 4A. TIM 400 may include, for example, modules for profile management 410, provisioning 420, console 430, authentication 440, cryptography 450, device interrogation 460, device management 470, communication 480, and connector 490.

The module for profile management 410 may include device profiles 4101 including, as seen in FIG. 4B, sets of profiles 4103 for mobile phones, televisions, set top boxes, NetTops, game consoles, and other devices—such as NetTVs. The module for profile management 410 may also include risk profiles 4102 including, as seen in FIG. 4B, a group of profiles for users 4104, a group of profiles for devices 4105, and a group of profiles for systems 4106. Provisioning module 420 may include modules 4202 for pro-provisioning, post-provisioning, onboard, and move. Console module 430 may include modules 4302 for operations (ops), logging, monitoring, tracing. Authentication module 440 may include modules 4402 for hardware-based zero knowledge strong authentication (HOKSA), behavior, password (PWD), and biometric authentication. Cryptography module 450 (denoted "crypto" in FIG. 4B) may include modules 4502 for a suite of algorithms, oblivious hashing (OH), verification, and key management. Device interrogation module 460 may include modules 4602 for interrogation of SIM (Subscriber Identity Modules or SIM cards), eSE (embedded secure elements), application identifiers, developer identifiers, TPM/MPM trusted platform module (TPM), mobile trusted module (MTM), GPS (global positioning system), platform identifiers, and stack identifiers. Device management 470 module may include modules 4702 for SRUM, SIB (secure identity binding), TRAA (trusted remote attestation agent), wipe/lock, and delegate, and module 4704 for IPD (interactive phishing detection). Communication module 480 may include modules 4802 for internet protocols (TCP/IP), telecom protocol, Near Field Communication/Bluetooth (NFC/BT), and secure SMS (short message service). Connector module 490 may include modules 4902 for Trinity/IAF (International Accreditation Forum, Inc.), AP (authentication provision), risk, and TSM (trusted service manager).

Figure 5:
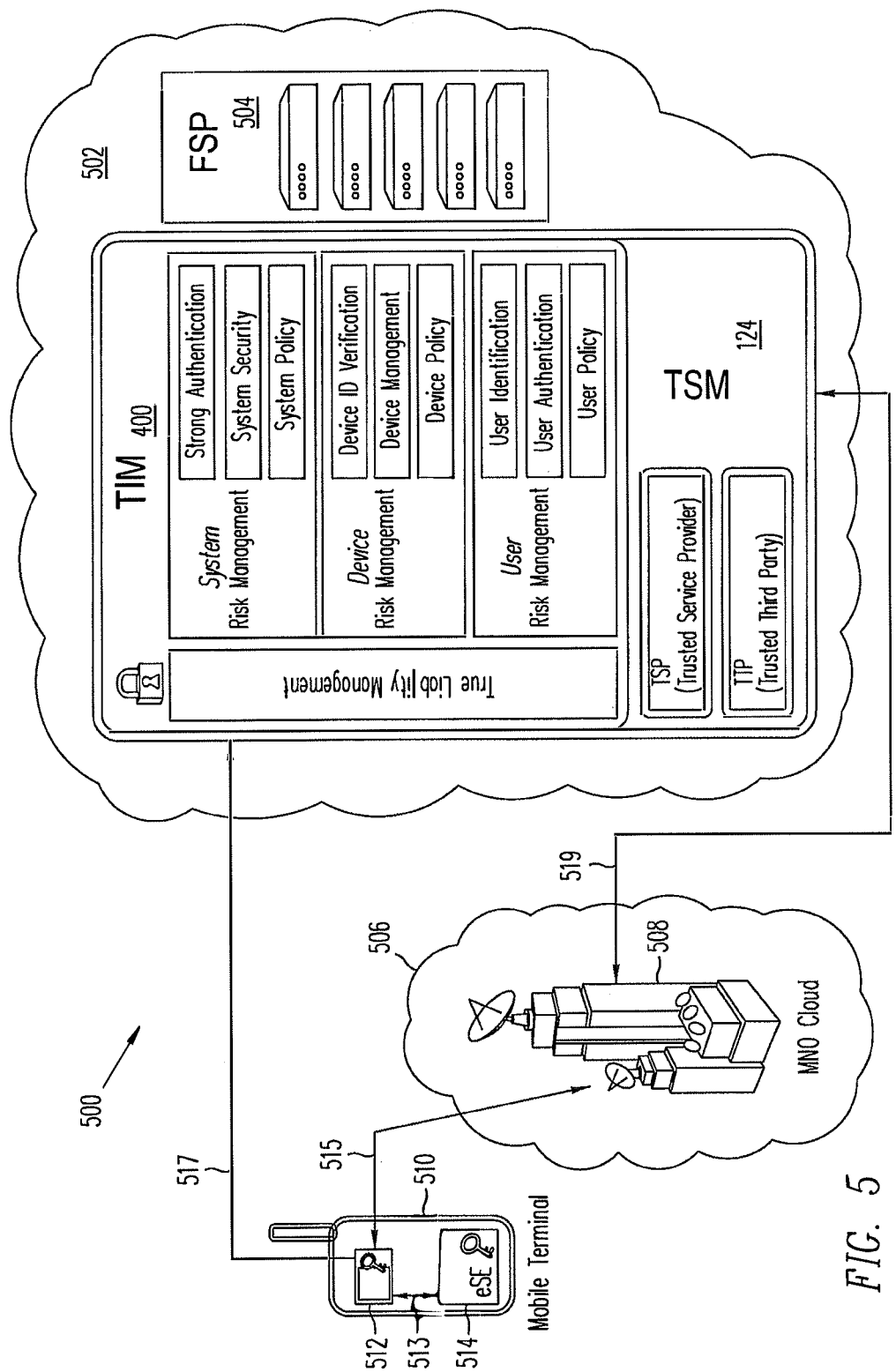
FIG. 5 is a system diagram illustrating a first example of TSM and TIM locations in an ecosystem for financial transactions in accordance with an embodiment.

FIG. 5 is a system diagram—which may also be described as a bank centric model—illustrating a first example of TSM 124 and TIM 400 locations in a mobile embedded payment (MEP) system 500 for financial transactions. As shown in FIG. 5, TIM 400 functions may be included in an FSP (financial service provider) cloud 502 with functions performed by the TSM 124. Thus, the TIM 400 and TSM 124 functions may both be provided by a single service provider, e.g., FSP 504. FIG. 5 also shows other features and elements that may be included in MEP system 500. MEP system 500 may include a mobile phone handset 510 (shown as "mobile terminal" in FIG. 5). Mobile device 510 may include a provisioning SIM card 512 and an eSE 514 (embedded secure element). A secure communication link 513 inside mobile device 510 may connect provisioning SIM card 512 and eSE 514. Mobile device 510 may ordinarily communicate via link 515 through MNO cloud 506 with the outside world. Provisioning SIM card 512 may also connect over link 517 with TIM 400. Mobile network operator (MNO) 508 may communicate with TSM 124 and TIM 400 via link 519.

Figure 6:
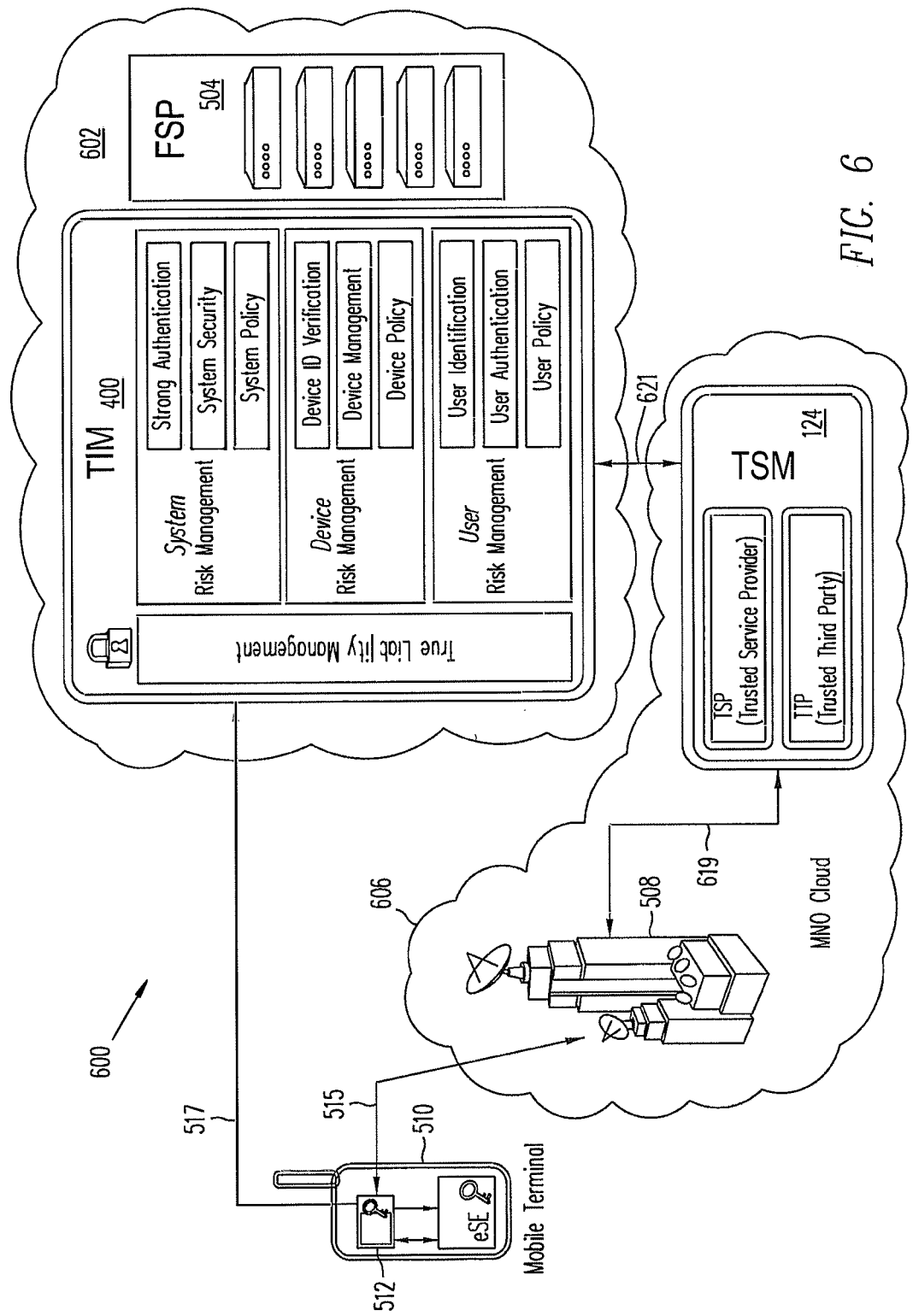
FIG. 6 is a system diagram illustrating a second example of TSM and TIM locations in an ecosystem for financial transactions in accordance with an embodiment.

FIG. 6 is a system diagram illustrating a second example—which may also be described as a delegate or shared management model—of TSM 124 and TIM 400 locations in a mobile embedded payment (MEP) system 600 for financial transactions. As shown in FIG. 6, TIM 400 functions may be performed by a service provider, e.g., FSP 504 in FSP cloud 602, independently of a provider of TSM 124 functions. In the example shown in FIG. 6, TSM 124 functions may be performed by an MNO 508 or a third party operating in conjunction with an MNO 508 in the MNO cloud 606. MEP system 600 may include a mobile device 510 connected via link 515 to MNO 508. MNO 508 may communicate with TSM 124 via link 619. TSM 124 may communicate with TIM 400 via link 621. A provisioning SIM card 512 of mobile device 510 may also connect over link 517 with TIM 400.

Figure 7:
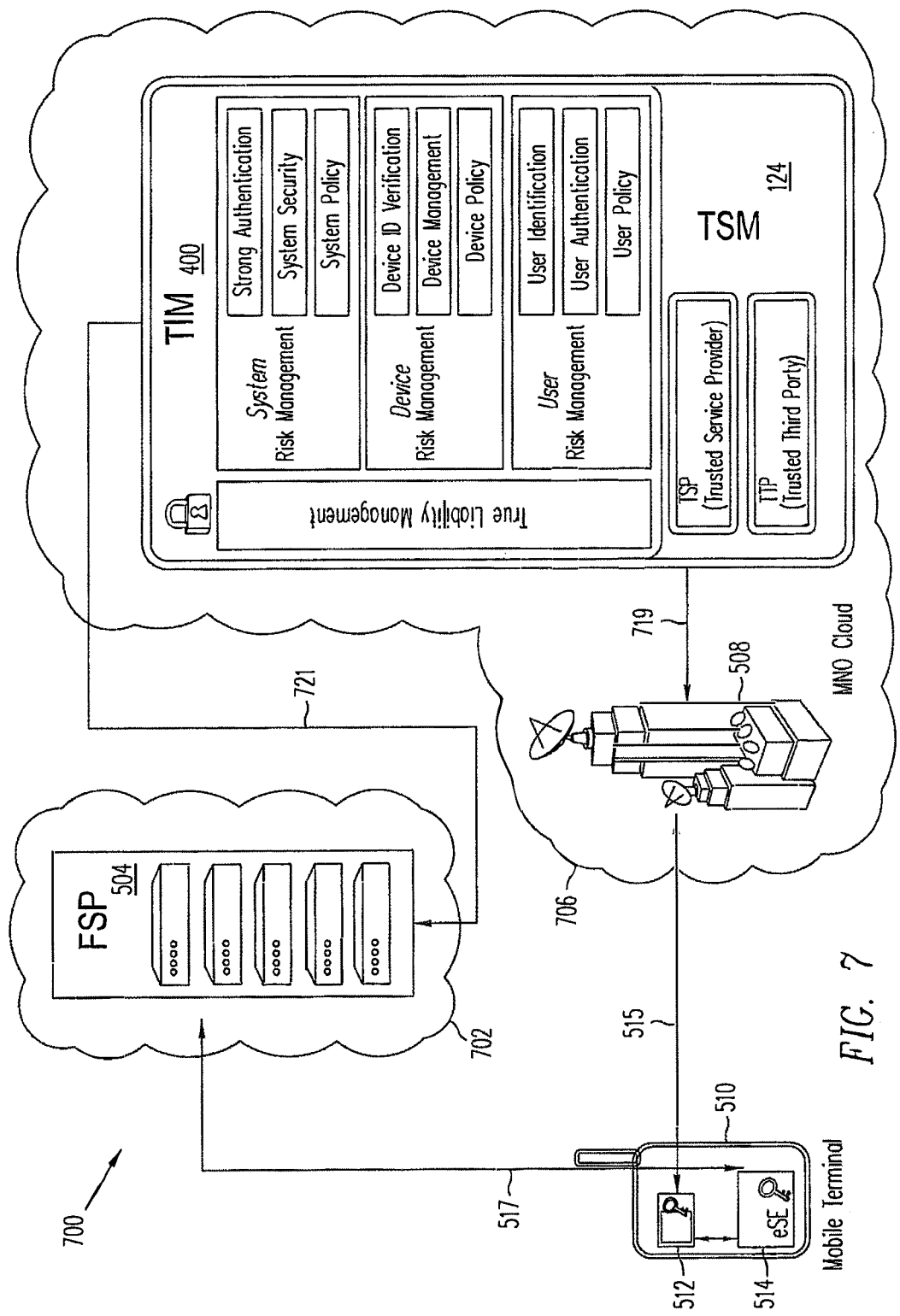
FIG. 7 is a system diagram illustrating a third example of TSM and TIM locations in an ecosystem for financial transactions in accordance with an embodiment.

FIG. 7 is a system diagram illustrating a third example—which may also be described as a carrier centric model—of TSM 124 and TIM 400 locations in a mobile embedded payment (MEP) system 700 for financial transactions. As shown in FIG. 7, TIM 400 functions may be included with functions performed by a TSM-124 and the TIM 400 and TSM 124 functions may both be provided by an MNO 508 or a third party operating in conjunction with an MNO 508 in the MNO cloud 706 independently of a financial service provider, e.g., FSP 504 in FSP cloud 702.

In the example shown in FIG. 7, MEP system 700 may include a mobile device 510 connected via link 515 to MNO 508. MNO 508 may communicate with TSM 124 and TIM 400 via link 719. TSM 124 and TIM 400 may communicate with FSP 504 via link 721. An eSE 514 of mobile device 510 may also connect over link 517 with FSP 504.

Figure 8:
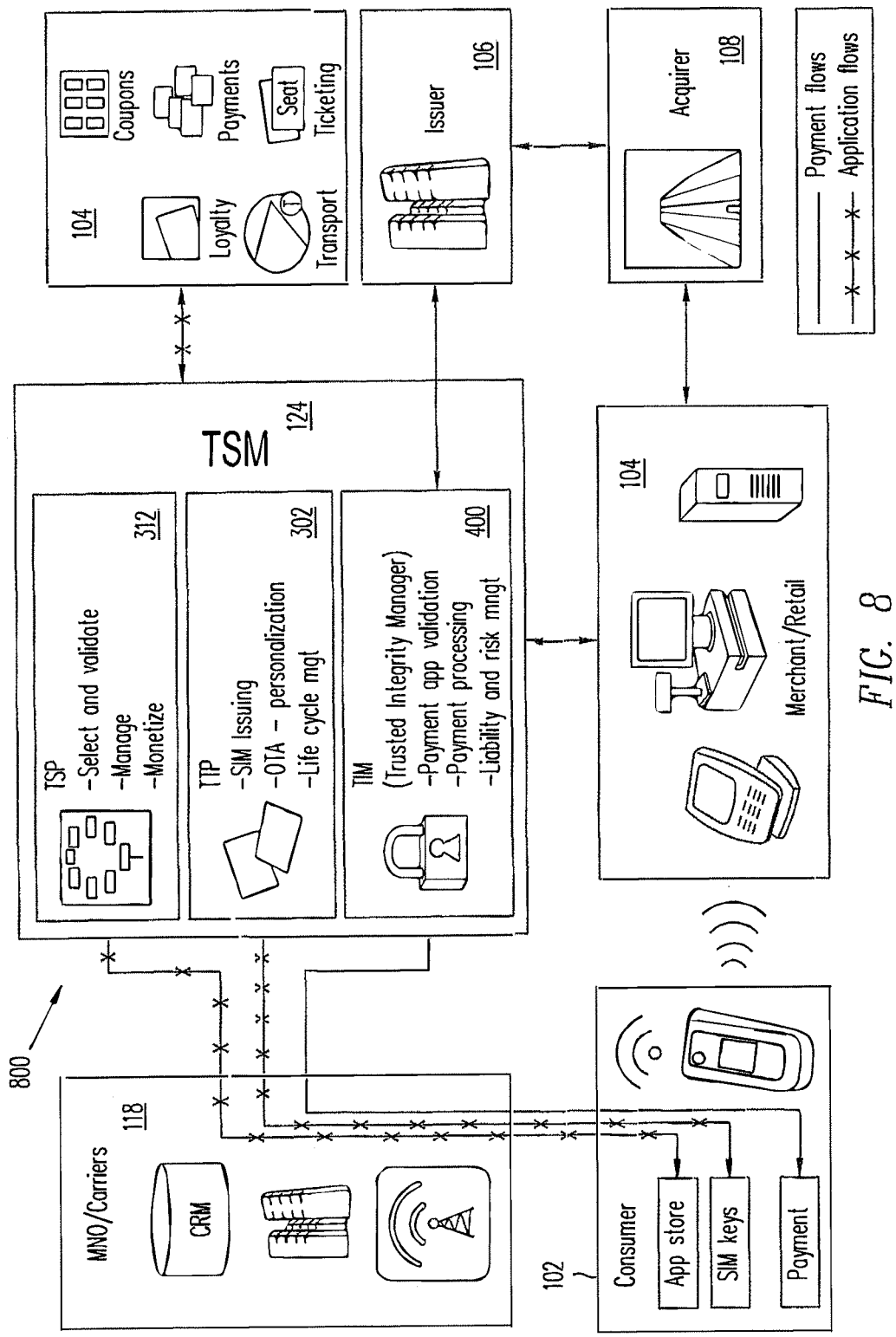
FIG. 8 is a system diagram illustrating payment and application flows in an ecosystem for financial transactions in accordance with one or more embodiments.

FIG. 8 is a system diagram illustrating payment and application flows in an MEP system 800 for financial transactions. FIG. 8 is similar to FIG. 1 and provides a more detailed illustration of payment and application flows. Although, FIG. 8 shows TIM 400 included as part of a TSM 124, FIG. 8 is applicable to the configurations shown in FIGS. 5, 6, and 7.

Figure 9:
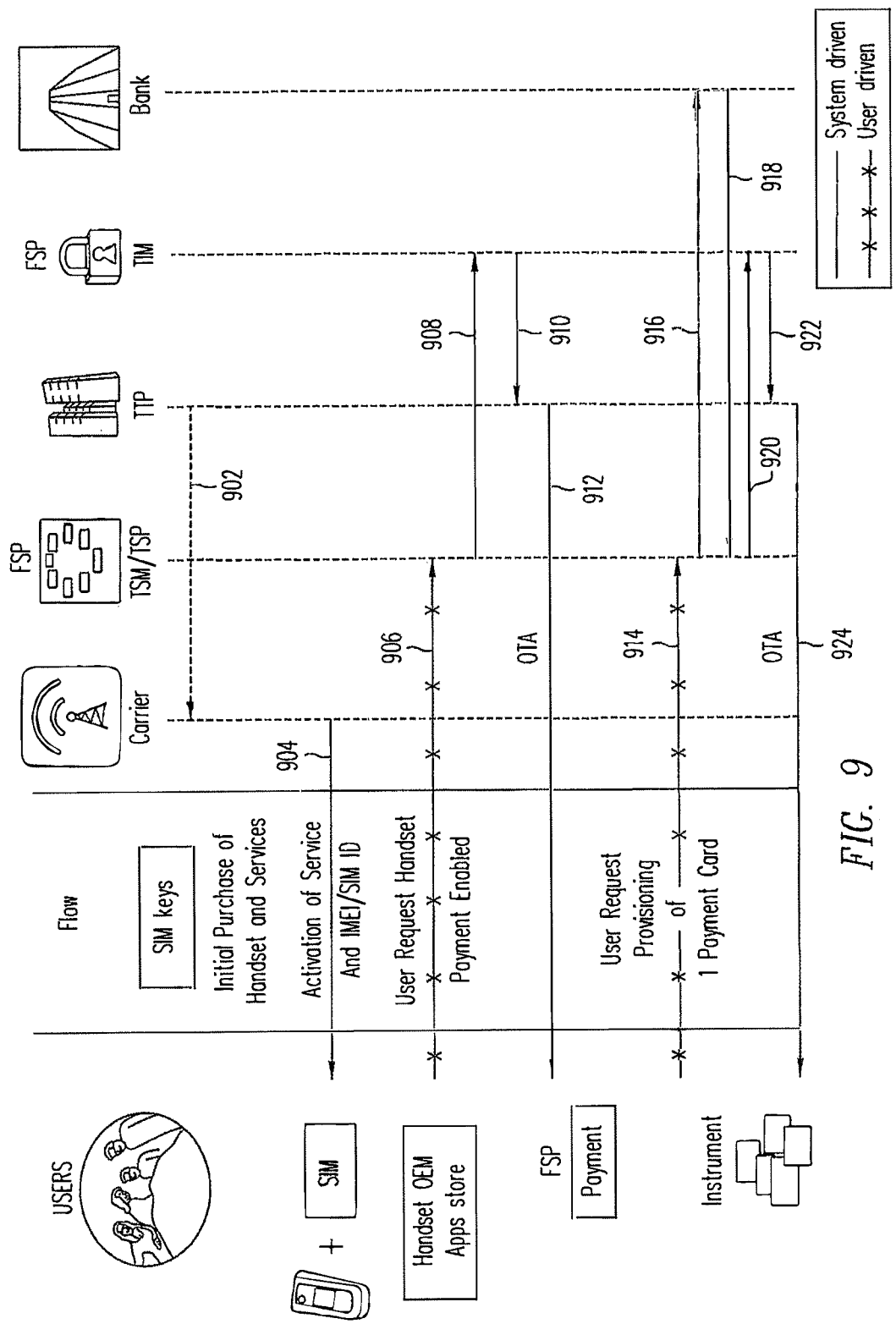
FIG. 9 is a process flow and interaction diagram illustrating system interactions for an ecosystem for financial transactions using a mobile phone function in accordance with an embodiment.

FIG. 9 is a process flow and interaction diagram illustrating system interactions for an MEP system—such as MEP system 500, 600, 700, or 800—for financial transactions using a mobile phone function. FIG. 9 shows interactions and flows among the entities listed horizontally across the top of the diagram, which are: Users, Carrier (e.g., an MNO), TSM/TSP (which may be operated by FSP), TTP, TIM (which may be operated by the FSP), and Bank (e.g., bank, credit card company, or other financial institution). Also listed at the top of FIG. 9 is a column labeled "Flow" which describes the type of item involved in an interaction between two entities as a sequence of events is traversed by moving vertically down the diagram.

Groups of arrows in the diagram illustrate various events. So, for example, the first event illustrated at the top of the diagram of FIG. 9 may be the supplying of SIM keys ("SIM keys" shown in the "Flow" column) from the TTP to the Carrier (indicated by the arrow 902 from TIP to Carrier). After an initial purchase of handsets and services (second entry in "Flow" column), the Carrier may activate service and a SIM card ID (third entry in "Flow" column) for a user, as indicated by the arrow 904 from Carrier to Users.

The next group of arrows (beginning with arrow 906 from Users to TSM/TSP) indicates that a user may request the handset to be payment enabled, which may involve the purchase of an app from TSM/TSP (arrow 906), as described above, authentication and validation of the app by the TIM (arrow 908), packaging by the TIM, and providing the app information to the TTP (arrow 910) for OTA installation (arrow 912) in a secure element (SE) of the handset, also as described above.

Provisioning of the handset, as described above, with a payment instrument (e.g., credit card, debit card, pre-paid card, or gift card) is also illustrated by the bottom set of arrows in FIG. 9, beginning with arrow 914, representing request for provisioning by the user to the TSM/TSP. The request may be forwarded to a bank (arrow 916), which may approve funding (arrow 918), e.g., from a user bank account. TSM/TSP may notify TIM that funding for the payment instrument is available (arrow 920), which may be forwarded to the TTP (arrow 922) and OTA installation of the payment instrument on the mobile device may be provided by the TTP (arrow 924).

The user experience (also referred to by the FSP as "front end flow") with regard to provisioning may described as follows: prior to using the payment instrument on the handset, the user will download (from an application store, for example), or launch, the pre-installed application of the FSP from the handset. The request to launch, the application of the FSP can come from the user or can be instigated by the carrier (e.g., MNO) or the bank upon enrollment of the handset to become a payment instrument. The application, also referred to as "Mobile Embedded Payment client" may be installed in the eSE (embedded secure element) and may also be referred to as FSP payment engine, FSP payment vault, and FSP application.

When the FSP application is installed in the eSE, the FSP becomes de-facto controlling authority and takes ownership of the Issuing Domain on the eSE in accordance with industry accepted technology (including, for example, Global Platform specifications). This is one of the TIM 400 functions in the background. The physical OTA function may be performed by a TTP/OTA partner. This requires a pre-provisioning that can be managed by silicon vendors or a post-provisioning, OTA mechanism to be put in place. There are, for example, known procedures that are already used in the industry at production or post-production time.

When the application is installed and the handset becomes trusted, and if no payment instruments were pre-packaged with the FSP application, the user can request the installation of new or additional payment instruments. These must be installed in the eSE if using the full FSP payment engine. However, in some cases, banks will want to maintain more control and may request to have their application and instrument residing on the UICC/SIM of the mobile device (e.g., mobile device 510) to still leverage the FSP payment engine of another FSP. In that case, the FSP application will need to contain the proper credential to be authenticated and authorized to be executed via the FSP payment engine.

Figure 10:
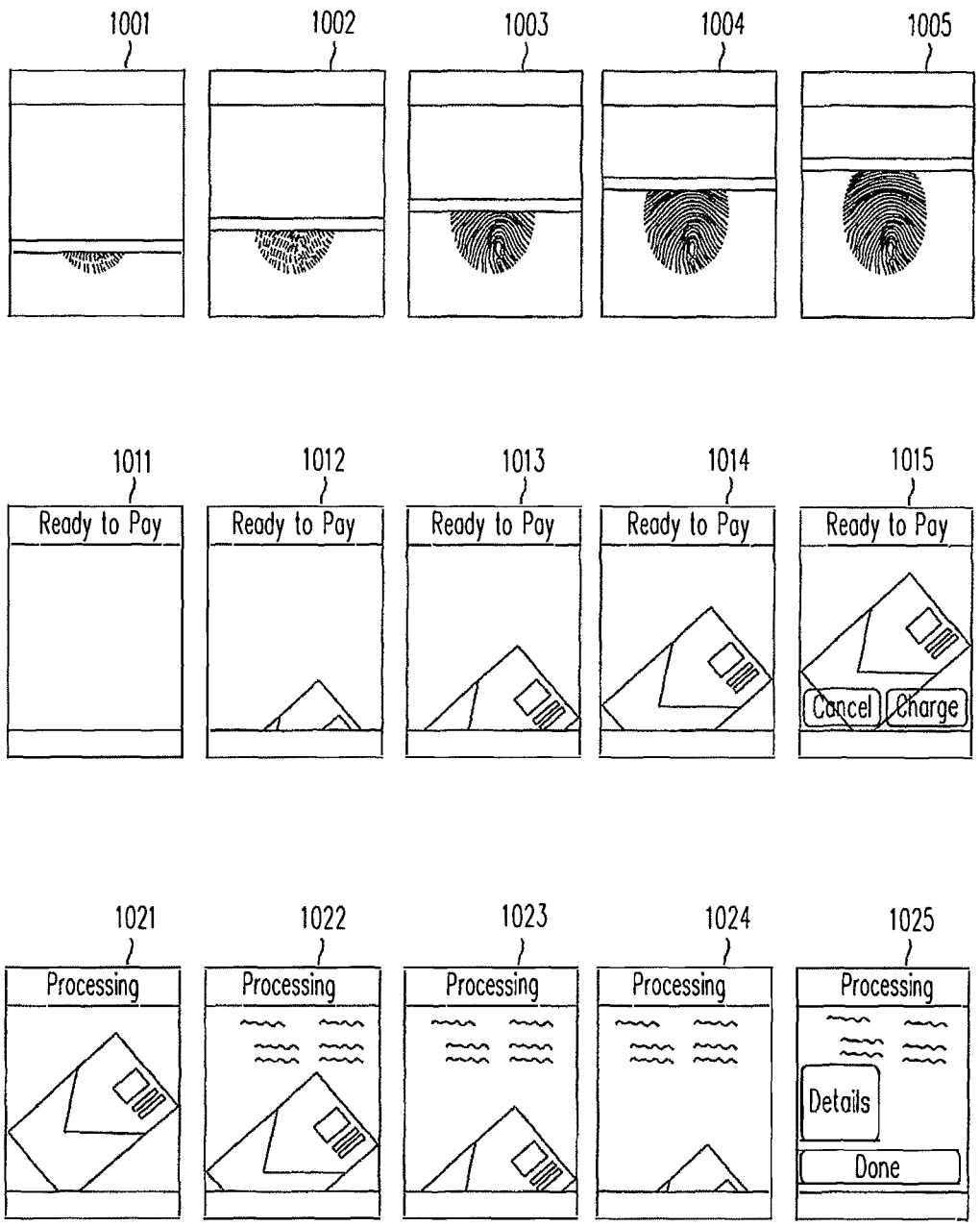
FIG. 10 is a sequence of user interface displays illustrating an example of a "one-touch-one-tap" payment process in accordance with an embodiment.

FIG. 10 is a sequence of user interface displays illustrating an example of a "one-touch-one-tap" payment process in accordance with an embodiment. The user experience with regard to using the phone for payment may described as follows: the user will launch the FSP "wallet" or the portion of the FSP application (client) not residing on the eSE from the user interface or by linking, or enrolling, the FSP application to the fingerprint (FP) reader. At interface displays 1001 to 1005, the user will slide the user's finger across the FP reader and the user's default FSP payment instrument will be launched. If no change is required, the user will tap his phone and proceed. In these example displays, interface display 1001 shows a progress bar that animates right to left and begins to move up to reveal the user's fingerprint that has been touched to the FP reader. In interface displays 1002, 1003, 1004, and 1005, the progress bar moves to the top of the display revealing more of the fingerprint as the progress bar moves, and the display of the fingerprint may darken as the scan of the progress bar moves to the top of the display. At interface display 1011, the progress bar may change to a top banner indicating, for example, "Ready to Pay". At interface displays 1012, 1013, 1014, and 1015, an image of a funding card, e.g., the default funding card, animates to the top of the display, and buttons, e.g., "Cancel" and "Change", appear once the funding card reaches its final position. At this point, for example, an option to change the funding source may be given to the user and then the user may need to go through one more display screen (e.g., interface displays 1011 to 1015 over again) to pick up the desired funding source. Interface displays 1021 to 1025, show an example display for the user once a payment has been made using the mobile device, e.g., mobile device 510. At interface display 1021, the "Ready to Pay" banner may change to an animated "Processing" banner. At interface displays 1021, 1022, and 1023, the funding card image may fade away as a receipt for purchase comes into view. At interface display 1025, once the funding card image is off screen, purchase details and a "Done" button may appear on the display, and the user may be given an option to terminate the display. When the payment is completed, the FSP may be able to leverage the POS data to actually extract the store name, brand, and location, and from the UPC identify the product on the digital receipt the user may want to use. The additional visibility for brand names provided by the "one-touch-one-tap" payment process may be an add-on service to the merchant. In the process flow for the payment instrument, this visibility creates a difference from the conventional consumer experience that at a retail store, the POS displays only the networks' brands (e.g., Visa®, MasterCard®, and others). The FSP payment engine may allow an advantage as to bringing the bank (for example) brand presence on the mobile handset, providing user visibility and creation of services around this visibility for merchants and banks.

Figure 11:
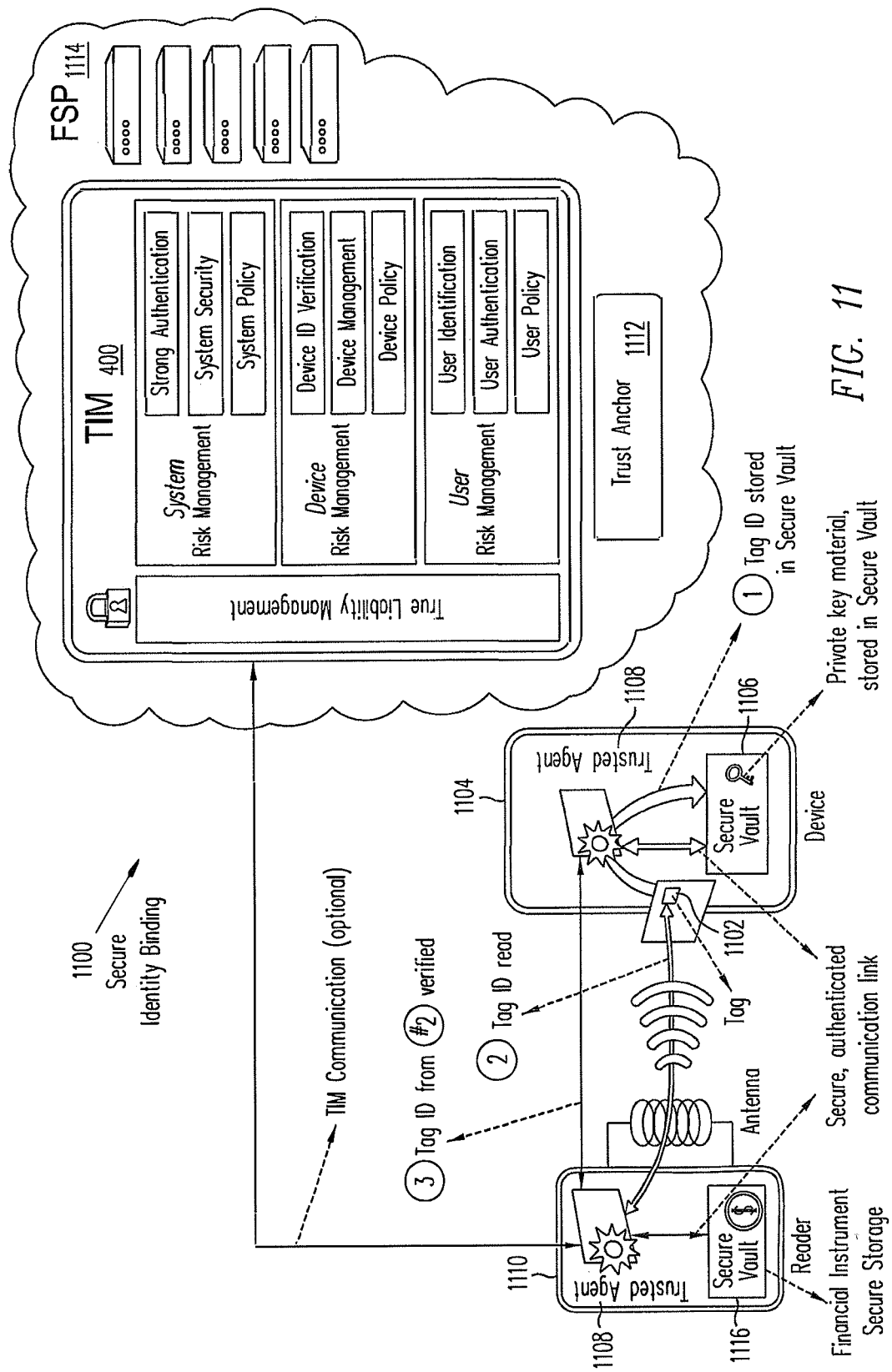
FIG. 11 is an entity-relationship diagram illustrating secure identity binding (SIB) in accordance with an embodiment.

FIG. 11 is an entity-relationship diagram illustrating secure identity binding (SIB) system 1100, which may operate in conjunction with TIM 400. An example of SIB is described with reference to near field communication (NFC) for purposes of illustration. Thus, NFC in this context is used as an example of a communication layer only and embodiments of the invention neither rely nor depend on NFC technology, which is used merely as an instance of a generic communication channel. NFC is a point-to-point wireless communication technology (as distinguished, e.g., from a protocol) that is based on the ISO 14443 proximity-card standard. NFC uses short-range, high-frequency signals to enable two-way interaction between electronics devices. A device called a "tag" (also referred to as an RFID tag) is commonly used in conjunction with NFC technology. A tag is a small physical object that can be attached to, or incorporated into a product. An RFID tag contains within it a unique digital identifier (usually a numeric value.) Tags are physically attached to a device that accepts payment (for example, a laundromat washing machine or a vending machine). Tags also contain silicon chips that enable them to receive and respond to queries from a device called an RFID reader/writer. An NFC-enabled mobile phone also could be a tag reader.

An identity validation issue that arises in general is how to securely "bind" the tag to the device. That is, how to ensure that the tag does indeed identify the physical device to which it is attached. Current techniques are typically based on physical binding such as gluing the tag to the device. Not only may this be expensive and present maintenance problems, it is also not secure. For example, an attacker could cover the original tag with electromagnetic shielding material such as aluminum foil, and then attach the attacker's own spoofed tag on top of the original one (thus impersonating the device) or simply swap the tags on two devices. The outcome is the same: the identity-binding assumption is violated.

Some tags are digitally signed. In this case the reader could verify the integrity of the tag by way of verifying the digital signature embedded in the tag (e.g., verifying the identity-binding using public key infrastructure (PKI)). The assumption of this verification is that the reader trusts the signer of the tag data by way of trusting the copy of the digital certificate that contains the public key of the signer. Signed-tag identity-binding verification does not solve the identity-binding problem. In other words, signed-tag identity-binding verification addresses the integrity verification of the tag itself but not the secure binding between the tag and the device. This is considered a fundamental identity management problem and becomes even more important when financial transactions are involved in the interactions between the tag and the device.

As illustrated in FIG. 11, identity-binding verification in accordance with one or more embodiments implements a verifiable logical binding that does not rely on the unverifiable physical binding between the tag 1102 and the device 1104. In a one-time operation, the tag identifier (referred to as "Tag ID") is stored in a hardware secure storage 1106 on the device using a trusted software component, e.g., trusted agent (TA) 1108. Then every time that the tag 1102 is read by a reader 1110, such as a mobile phone 510, the Tag ID is verified with the content of the hardware secure storage 1106, also referred to as secure vault 1106. If there's a match, then the Tag ID is trusted and is presumed to represent the identity of the device 1104.

One embodiment requires the following components on the device 1104: secure vault 1106 and TA (trusted agent) 1108. The secure vault 1106 is a secure storage mechanism that holds private identifying key material such as digital private keys. Secure vault 1106 could be hardware-based such as a Trusted Platform Module (TPM), Mobile Trusted Module (MTM), embedded secure element (eSE), or it could be a software security entity, such as a password-protected file such as a software key store. Hardware-based secure vaults are preferred as they potentially provide a much higher level of protection and are not susceptible to software-only attacks (also known as system-wide attacks). Software-based secure vaults are also possible, however, albeit possessing lower security characteristics.

The trusted agent or TA 1108 is a software entity that is trusted and the integrity of which is verified every time the TA 1108 is used. For example, TA 1108 may be a trusted remote attestation agent (TRAA) in accordance with an embodiment and as described below with reference to FIG. 13. The presence of a TA 1108 on the reader 1110 (such as a mobile phone 510) is preferred but not necessary. That is, if other security mechanisms exist on the reader 1110 that assert the trust, then the identity-binding verification will be as effective as if there were a TA 1108 present on the reader 1110. Reader 1110 may also have a secure vault 1116.

Trust establishment and verification may be achieved as follows:

1) TA 1108 is created by the device manufacturer (or a trusted third party, TTP) and is put on the device 1104.
2) A cryptographic, one-way, hash function of TA 1108 is calculated; call it $H_1(TA)$.
3) $H_1(TA)$ is digitally signed by a trusted entity called Trust Anchor 1112 (for example, the FSP 1114 or a device manufacturer may also act as Trust Anchor 1112). The digital signature is a PKI operation which means that the Trust Anchor 1112 owns a pair of public and private keys (namely $Key_{public}$ and $Key_{private}$ respectively.) The $H_1(TA)$ data piece is digitally signed by Trust Anchor 1112 using its $Key_{private}$. The signed hash of TA 1108 is referred to as $S(H_1(TA), Key_{private})$. The notation $S(H_1(TA), Key_{private})$ does not indicate that $Key_{private}$ either appears or is somehow accessible in this data entity; the notation is a conventional mathematical function notation indicating that $Key_{private}$ is used for the calculation. The value of $Key_{private}$ a, can not be inferred from this data.
4) To verify the integrity of $S(H_1(TA), Key_{private})$ one only needs to have access to, and trust the integrity of $Key_{public}$ belonging to Trust Anchor 1112.
5) The digital signature verification process is a software operation, which may also be very fast. The software component that performs digital signature verification is referred to as the V. The software component "V" operates as: $V(S(H_1(TA), Key_{private}), Key_{public})$ and returns TRUE or FALSE (meaning signature verification successful or failed, respectively.)
6) To optimize the secure vault memory usage, a cryptographic one-way hash function of $Key_{public}$ is also calculated. Call it $H_2(Key_{public})$. $H_1$ and $H_2$ could be the same cryptographic one-way hash function or could be different cryptographic one-way hash functions.
7) $Key_{public}$ is loaded into the device's 1104 general memory (e.g., random access memory or RAM).
8) $S(H_1(TA), Key_{private})$ as well as $H_2(Key_{public})$ and V are stored in a read-only area of the memory of device 1104, such as read-only memory (ROM), for example, by the device manufacturer. V should also reside or be placed in an executable area of ROM.
9) Now the integrity and authenticity of TA 1108 can be verified—and this verification can be trusted—every single time TA 1108 is used. Verification proceeds as:
   9.1) V is executed in ROM of device 1104 (if ROM contains executable area and V resides there). The trust on V is as strong as the protection of ROM (which is hardware-protection, meaning it is not susceptible to software-only attacks.)
   9.2) $H_2(Key_{public})$ is calculated and verified against $H_2(Key_{public})$ in the secure vault 1106. If verification fails, then the device 1104 is considered tampered-with. If verification succeeds, then $Key_{public}$ (which is present in RAM of device 1104) is considered trustworthy.
   9.3) $V(S(H_1(TA), Key_{private}), Key_{public})$ is calculated. If V succeeds (i.e. V returns TRUE) then TA 1108 can be trusted. Otherwise the system 1100 is considered tampered-with.
10) At this point, assuming V succeeds, TA 1108 can be trusted, and therefore whatever TA 1108 trusts can also be trusted From this point on TA 1108 accesses and verifies the Tag ID stored in secure vault 1106, and responds to reader's 1110 requests for Tag ID. Since TA 1108 is trusted, the responses of TA 1108 to requests are trusted.

The secure identity binding in accordance with one or more embodiments involves a one-time-per-tag provisioning process. That is, once a tag 1102 is attached to the device 1104, the Tag ID is read and stored in the device's 1104 secure vault 1106 by the Trust Anchor 1112 and using TA 1108. On subsequent tag 1102 replacements (e.g. for maintenance purposes) the provisioning process may be repeated so that the Tag ID of the current tag 1102 always is present in the secure vault 1106. Further security augmentation could be implemented. For example, records of the device-tag ID, the GPS (Global Positioning System) location of the device, and other data could be stored within the FSP 1114 infrastructure (such as TIM 400). This infrastructure could be consulted for risk management operations and other security, authentication, and identification purposes.

After the provisioning phase, whenever a reader 1110 (such as an NFC-enabled mobile phone or other consumer electronic device that could be used for payment) reads the Tag ID attached to the device 1104, the reader 1110 communicates that Tag ID to the device's 1104 TA 1108. The communication between the reader 1110 and device's 1104 TA 1108 can be trusted because the communication happens between two trusted entities (e.g., the reader 1110 and device's 1104 TA 1108). Eavesdropping this communication channel is difficult (for example, using NFC, communication occurs within a short proximity) and even if done successfully, does not yield any useful attack vector for the attacker. The reason for this assertion is that the attacker has to be able to successfully: 1) send a spoof signal (i.e. spoofed Tag ID) to the reader 1110, and 2) block the response sent by device's 1104 TA 1108.

The chances of satisfying the foregoing two conditions is miniscule in practice. Now if the Tag ID reported by the reader 1110 does not match the Tag ID in the secure vault 1106 of device 1104, then the TA 1108 responds with a "no-match" message back to the reader 1110, optionally logs the event, puts the device on "hold" state as this might indicate a tag-tampering or tag-replacing attempt. A "potential-tag-tampering" message could also be sent to the FSP 1114 infrastructure (by the device 1104, reader 1110, or both) to put the device 1104 on an "elevated-risk" status and help FSP 1114 with its distributed risk management infrastructure (including, e.g., TIM 400).

If the device 1104 does not include a secure vault or TA, then the Tag ID could be sent to the FSP 1114 infrastructure (e.g. TIM 400 database) during the provisioning process. In this case, whenever a reader 1110 attempts a transaction using such a Tag ID, then the GPS location of the reader 1110 (assuming the reader 1110 is GPS-capable) may be sent to FSP 1114 infrastructure, and then FSP 1114 sends a message back to the reader 1110 with usable identifying information (including, for example, a message such as "our records show this is a vending machine, located in 2211 North First St., San Jose, CA", or a picture of the device 1104) that could assist the user of reader 1110 in determining whether the device 1104 is legitimate.

Figure 12:
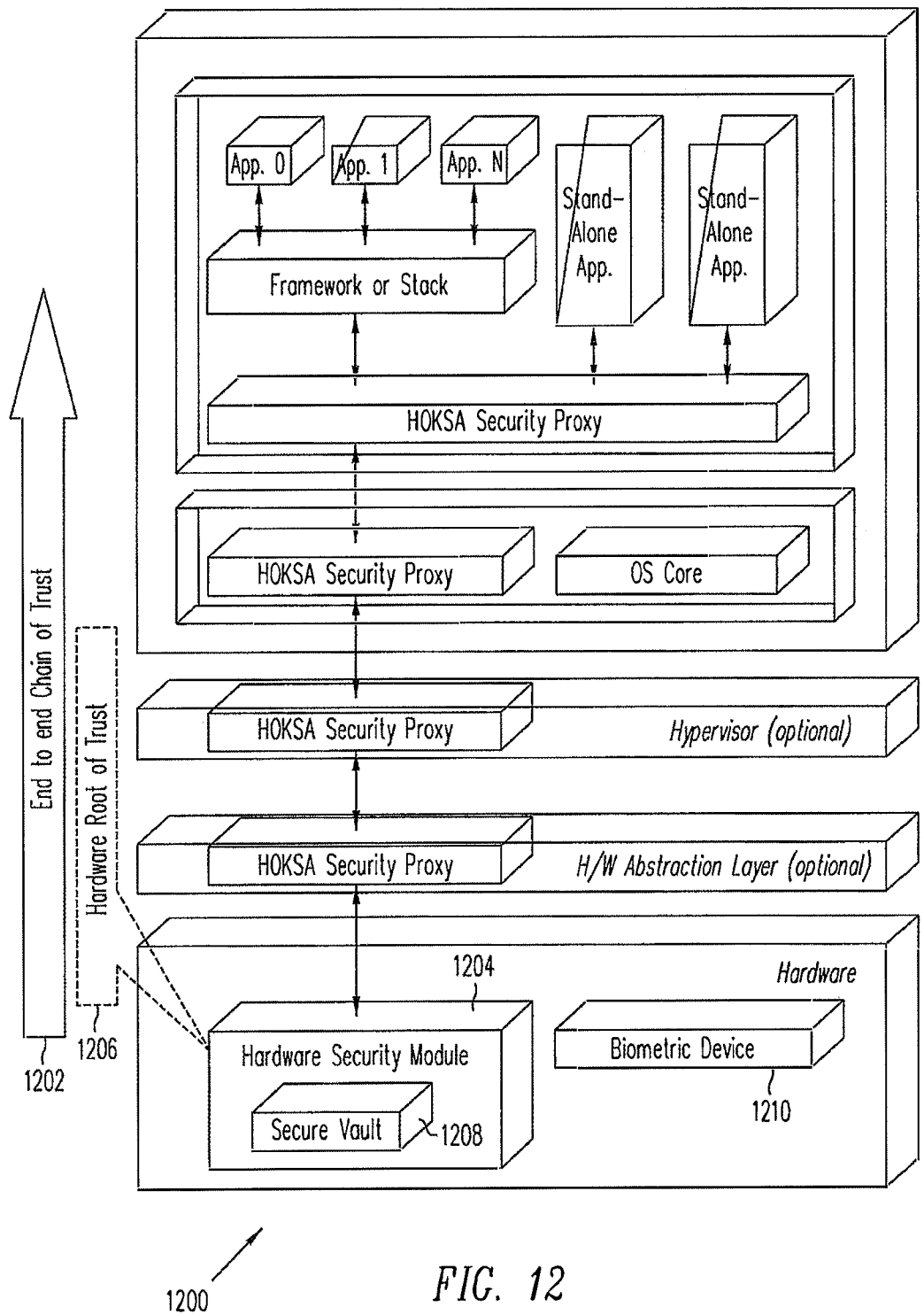
FIG. 12 is a system block diagram illustrating an example of hardware-based zero-knowledge strong authentication (HOKSA) according to one embodiment.

FIG. 12 is a system block diagram illustrating an example of a hardware-based zero knowledge strong authentication (HOKSA) system 1200. One of the fundamental pillars of security is strong authentication. The strongest form of authentication involves the combination of more than one authentication factor. One such combination of factors may be categorized as: 1) what you know, e.g., passwords, passphrases; 2) what you have, e.g., hardware tokens, private keys; and 3) what you are, e.g., biometrics. When combined properly, these artifacts force an intruder to compromise several factors before being able to mount a meaningful attack. Although most strong authentication systems are single-factor systems, they can be combined with an additional factor, like a software or hardware token, to construct a multifactor system. What distinguishes strong authentication systems from other, weaker one-factor methods is the level of security that they leverage from that one factor. A strong authentication system must protect even low-entropy ("guessable") authentication methods from off-line attacks, even against adversaries with complete access to the communication channel. Strong authentication systems typically exchange a session key as well, which enables both data confidentiality and integrity after authentication has been successfully performed.

Many password authentication systems claim to solve this exact problem, and new password authentication systems are constantly being proposed. Although one can claim security by devising an authentication system that avoids sending the plaintext secrets (e.g., proofs) unencrypted, it is much more difficult to devise an authentication system that remains secure when: 1) attackers have complete knowledge of the protocol; 2) attackers have access to a large dictionary of commonly used passwords; 3) attackers can eavesdrop on all communications between client and server; 4) attackers can intercept, modify, and forge arbitrary messages between client and server; and 5) a mutually trusted third party is not available.

HOKSA system 1200 employs a strong authentication mechanism that is based on "Zero Knowledge proof" and is augmented by hardware-based protection of secret key material, as well as optional biometric technologies on the client systems to initiate the authentication process. HOKSA system 1200 solves the problem of secure authentication in cases where the "prover" (e.g., a requester of authentication) must own some secret material (such as private key material) and carries no other secret information, and where the "verifier" (e.g., the recipient of the authentication request, such as TIM 400) decides whether or not the authentication request should be granted. HOKSA system 1200 satisfies the following requirements: 1) system 1200 deploys hardware-security modules to store the secret material on the clients; examples of hardware-security modules include: TPM (Trusted Platform Module), MTM (Mobile Trusted Module), SE (secure element), eSE (embedded secure element), SD card (Secure Domain, a secure memory card such as TrustedFlash); 2) system 1200 may use biometric technologies to initiate the authentication process; 3) system 1200 doesn't allow the attacker to impersonate the prover even if the communication channel between the prover and verifier is compromised; 4) system 1200 does not require a TTP (trusted third party) during the authentication process; and 5) system 1200 consumes less power for this operation than the typical PKI-based authentication, which makes system 1200 suitable also for battery-powered hand-held devices.

Many devices contain a form of hardware security module. The challenge is to properly deploy the hardware security module and leverage its capabilities so that the applications that require protection could use the hardware security module consistently and securely. A HOKSA system 1200 accomplishes these tasks by storing the private key material in a hardware protected security device and allowing access to it only through a secure and authenticated mechanism. This authentication mechanism is based on Zero Knowledge Proof.

FIG. 12 illustrates one embodiment of a HOKSA system 1200 and its components. Fundamental features of HOKSA system 1200 include 1) establishing unbroken, end-to-end (E2E) security 1202; and 2) enabling fast, power-efficient, and strong authentication. Each of these features is described below. System 1200, while very relevant for consumer electronic devices (CED), is also applicable for non-CED environments.

An essential element of security is establishing an unbroken trust chain during both of two phases referred to as the authentication phase and the channel protection phase. When the trust-chain is weakened, broken, or flawed, then hackers have an opportunity to exploit the weaknesses and attack the system. For example, assume that A and B need to authenticate each other prior to establishing a communication channel, as diagrammatically indicated by:

$$A \leftarrow [\text{communication channel}] \rightarrow B$$

A and B may be called end-points of the communication channel because in real world scenarios the communication channel passes through multiple connection points called hops, as diagrammatically indicated by:

$$A \leftarrow [(hop\_0) \leftarrow \rightarrow (hop\_1) \leftarrow \ldots \rightarrow (hop\_n)] \rightarrow B$$

End-points could be local (that is, the end-points reside within the same device or execution environment) or the end-points could be foreign (that is, the end-points belong to different devices or execution environments.) One example of local end-points is the common design for computing devices such as a personal computer (PC), a laptop, or other CEDs. An example of foreign end-points is that of two (usually) physically separate systems communicating remotely. In real life scenarios the usual case is typically a hybrid one, for example, a combination of local and foreign end-points involved in communication and data transfer.

An important characteristic of HOKSA system 1200 is the establishment of a verifiable E2E (end-to-end) trust 1202 that is rooted in a hardware security module (HSM) 1204 that is referred to as root of trust (ROT) 1206. The chain from ROT 1204, 1206 to the component using ROT 1206 is called chain of trust (COT) 1202. It is critically important that COT 1202 satisfies the following two conditions at each step of the way, from hardware ROT 1204, 1206 up to the component that leverages ROT 1206: 1) channel protection; and 2) mutual authentication.

Channel protection means that the communication channel between the two end points must be protected at each step of the way, as in the second diagram above. Channel protection also implies that the channel contents can not be easily eavesdropped. That is, eavesdropping efforts would be either very expensive, very time-consuming, or would require a nontrivial level of technical knowledge commonly unavailable. This type of channel protection is typically accomplished by using hardware protection, strong encryption, or both.

Mutual authentication means that at each step of the way, as in the second diagram above, the end-points of each communication-hop authenticate each other. The mutual authentication condition can be relaxed if other protection mechanisms are in place, or if the risks associated with relaxing this condition are miniscule, as far as system E2E security (e.g. COT 1202) is concerned.

At this point and by meeting the conditions of channel protection and mutual authentication, the requirements for a first fundamental feature of HOKSA system 1200—that of establishing unbroken, E2E security—are met. The following describes how the requirements for a second fundamental feature of HOKSA system 1200—that of enabling fast, power-efficient, and strong authentication—are met.

HSM 1204 includes a hardware-protected area of memory which is referred to as a secure vault 1208. Hardware-protection in this context means that the contents of memory could only be accessed by privileged and authenticated entities, hence the term secure vault 1208. To illustrate by example, assume that some private key material $Key_{(private)}$ (e.g., some digital data that is not to be accessible to the general public) is stored in the secure vault 1208. $Key_{(private)}$ may possess the following qualities: 1) $Key_{(private)}$ is unique, cannot be forged or guessed; it is hence the device's identity; 2) $Key_{(private)}$ is inaccessible by unauthenticated and unintended entities, because $Key_{(private)}$ is stored in secure vault 1208; and 3) $Key_{(private)}$ can therefore be used to strongly authenticate the device 1210. These three qualities satisfy the strong authentication requirement of the second fundamental feature of HOKSA system 1200.

Satisfaction of the fast and power-efficient conditions for the second fundamental feature of HOKSA system 1200 is described as follows: $Key_{(private)}$ may be used as the proof-material for Zero Knowledge Proof of Knowledge. That is, the device 1210 stores the $Key_{(private)}$ in the secure vault 1208 area of its HSM 1204, and then uses it to engage in a Zero Knowledge Proof with outside entities that need to authenticate it. This mechanism guarantees that $Key_{(private)}$ remains private. Zero Knowledge Proof implementations are much faster mechanisms compared to other mechanisms (about two orders of magnitude, for example, compared to RSA-based identification schemes), and therefore require less computation (e.g., number of processing cycles). This satisfies the fast condition required for the second fundamental feature of HOKSA system 1200. There is a direct correlation between the number of processing cycles and the power consumption of the device performing the computation, hence satisfying the power-efficient condition required for the second fundamental feature of HOKSA system 1200.

Zero Knowledge Proof is a formal mathematical concept. One fundamental quality of this class of formal proof systems is called indistinguishability. Any mathematical proof system (such as Zero Knowledge) has two classes of actors: prover (who proves the claim) and verifier (who verifies the proof offered by the prover.) To evaluate and assess the security and safety of the proof offered in such systems, the verifier is considered either an honest verifier (that is, the verifier follows the proof system protocol verbatim) or a dishonest verifier (that is, the verifier does not follow the protocol verbatim.) This technique allows the system to verify the correctness of the claim irrespective of whether the protocol suggested by the prover is followed by the verifier. An important side effect of this quality is indistinguishability. That is, in order for the proof to be asserted (meaning, no "knowledge" of the secret is released) it should be indistinguishable from verifier's point of view irrespective of verifier's honesty. In simpler terms, no knowledge is leaked about the secret, or the way that the possession of the secret is proved.

Figure 13:
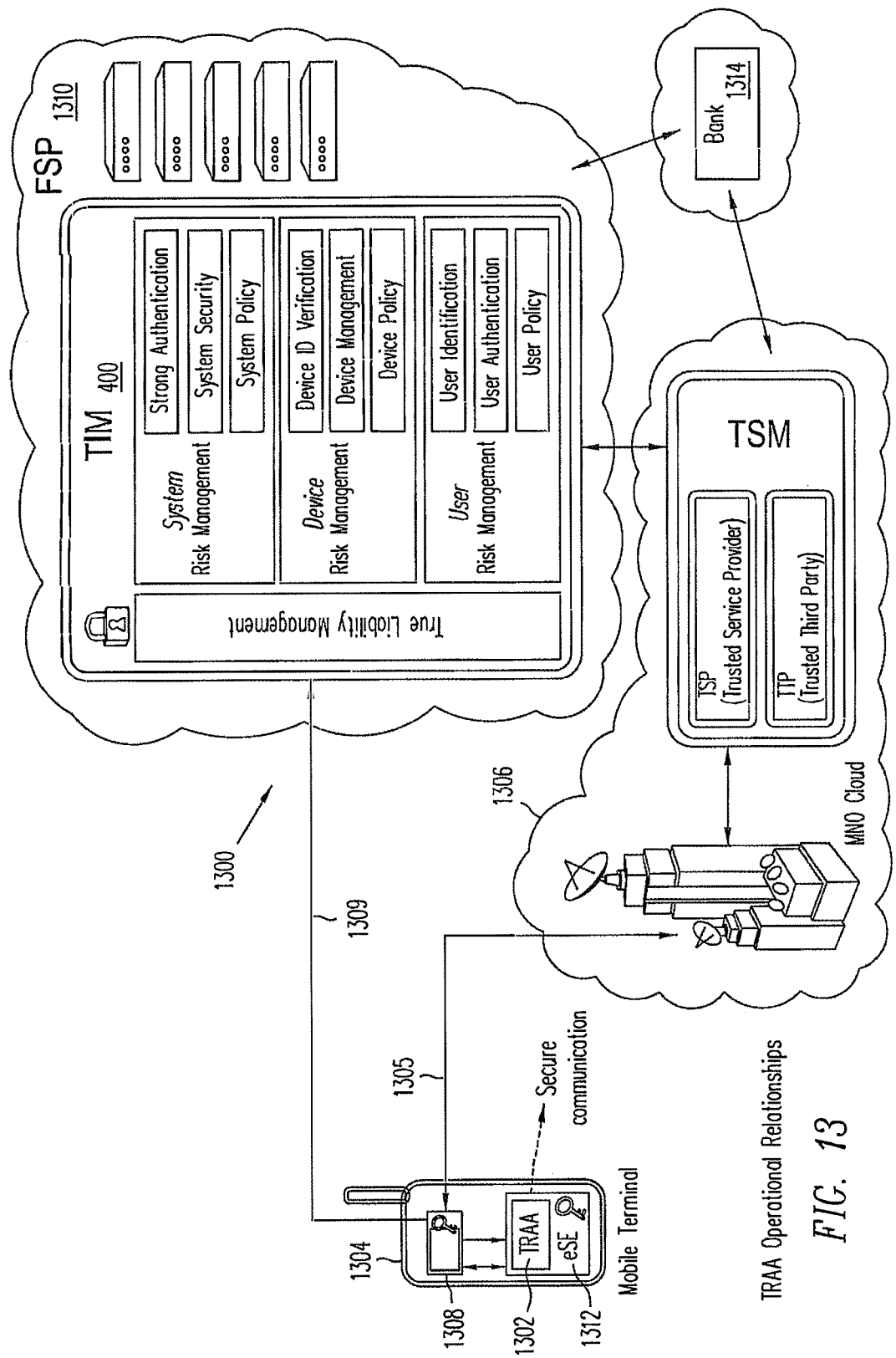
FIG. 13 is an entity-relationship diagram illustrating trusted remote attestation agent (TRAA) system level operational relationships in accordance with an embodiment.

FIG. 13 is an entity-relationship diagram illustrating an MEP (mobile embedded payment) system 1300 and a trusted remote attestation agent (TRAA) 1302 and system level operational relationships. Determining the security status of a mobile device (e.g., mobile terminal 1304) that holds financial instruments is nontrivial. When such a device (e.g., mobile terminal 1304) is offline (that is the communication with home network 1306 (e.g., MNO cloud 1306), which is the network to which the device is subscribed to, becomes unavailable) performing this task becomes even more difficult because typical remote pulse-check techniques are not applicable. For mobile phones (e.g., mobile terminal 1304), one vector of attack for hackers to obtain privileged-access to the terminal is to remove or otherwise disable the SIM (Subscriber Identity Module) card 1308 and interrupt the communication channel between the phone 1304 and the mobile network 1306 and other endpoints such as those of financial service providers (FSP) 1310. This type of attack will ease the hackers' attempt to circumvent network-based security mechanisms that are put in place to protect the integrity and confidentiality of financial instruments on the device. This will increase the chance of mounting a successful attack and in turn results in an increased risk to financial institutions (e.g., bank 1314, FSP 1310), thus hindering the efforts to enable offline transaction capabilities on the mobile phone 1304.

TRAA 1302 addresses these problems by providing a set of pulse-check type steps to ensure that the security-sensitive connections (e.g., connections 1305, 1309) are available and active. If a vital check fails then a predetermined restriction may be enforced. The security provided by TRAA 1302 may be considered to be as good as the strength of the enforcement mechanism of restriction rules.

The security provided requires the presence of TRAA 1302 on the mobile device 1304. TRAA 1302 may be, for example, a software application that satisfies the following requirements:

1) TRAA 1302 is trustworthy itself. That is, TRAA 1302 is either stored in a hardware secure module such as eSE (embedded Secure Element) 1312 or TPM (Trusted Platform Module), or its integrity can be verified and attested to. Mechanisms to establish this integrity check include (but not limited to) digital signature verification or oblivious hashing (OH) techniques.

2) TRAA 1302 has knowledge of the same SIM card 1308 that was present when the mobile phone was provisioned with the financial instrument by way of storing and protecting the SIM card's unique identifier value. (See, e.g., FIG. 9, arrows 902, 904 and arrows 922 through 924) This SIM card is referred to as the provisioning SIM 1308.

3) TRAA 1302 implements a method to periodically:
   3.1) Verify self-integrity: if this verification fails, the financial instruments on the phone 1304 are put in "lock-state". That is, the financial instruments need to be re-enabled by calling the service center (mobile operator 1306, or financial institution (e.g., bank 1314 or FSP 1310), or both.)
   3.2) Check the existence of the provisioning SIM: if this check fails, then the financial instruments are put on "hold-state". That is, once the provisioning SIM 1308 is available again the financial instruments will become available to use.
   3.3) Check the connectivity to MEP (Mobile Embedded Payment) Backend services (e.g., TIM 400, FSP 1310). TIM 400 may be part of FSP's 1310 infrastructure to support payment on consumer electronics devices such as mobile phones 1304.
   3.4) Check the connectivity 1305 to home mobile network 1306: if this check fails, then the financial instruments are put on "cap-state". That is, a predetermined transaction cap (e.g. $20) is enforced and transactions with a value above this amount are denied until and unless all the vital checks (e.g., existence of the provisioning SIM 1308, connection 1309 to MEP Backend (e.g., TIM 400), connection 1305 to home mobile network 1306) become available.
   3.5) The frequency of the above pulse-check type mechanisms (also referred to more briefly as "checking mechanisms" including the self-verifying of integrity) may be tuned by the MEP system 1300 (e.g., TIM 400, FSP 1310). Furthermore this may be a function of the risk-profile associated with the user, mobile phone 1304, and the location (e.g., using geo-location techniques with GPS) from where the transactions are initiated.

TRAA is not limited strictly to mobile devices such as mobile phone 1304, and may also be useful for other consumer electronic devices—including, for example, NetTVs and NetTops—for which the SIM 1308 may be substituted by another uniquely identifiable available network communication element.

Figure 14:
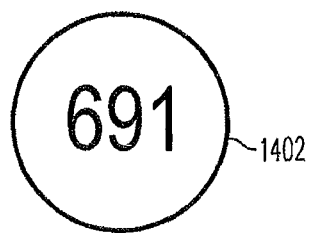
FIG. 14 is an example of an interactive phishing detection (IPD) visual indicator in accordance with an embodiment.

FIG. 14 is an example of an interactive phishing detection (IPD) visual indicator 1402 in accordance with an embodiment. An important aspect of any open model such as that of the Internet is, by definition, that the applications can be written by anybody; not just the original source. That is, the mere fact that a viable business has legitimate services to offer on its website does not stop malicious entities from posing as the genuine website and harvesting users' credentials. This artifact of open models poses an important security challenge, which is how to identify and stop a rogue application. An important class of rogue software is phishing applications. Phishing is defined as the process of attempting to acquire sensitive information such as user credentials (e.g., username, password, or credit card details) by masquerading as a trustworthy entity. Phishing is a nontrivial problem, solutions to which may require multiple entities in various layers of the ecosystem to cooperate and participate. As the problem is distributed, it makes sense that solutions should likewise be so distributed.

Phishing-prevention is a highly complex problem; one that possesses both technical and social-engineering facets. Determining whether an application is rogue, or otherwise unauthorized to perform an action is a nontrivial task that depends on many factors such as the Operating System (OS) and the software platform (also referred to as stack) on which the application runs, its user interface (UI) composition, its interaction model with other applications and services, and many other factors. The definition of rogue itself is also very generic and imprecise. At an abstract level, solving the phishing problem is equivalent to identifying and allowing an authentic application (and consequently allowing it to acquire the aforesaid credentials) and at the same time identifying and disallowing a rogue application, which impersonates as an authentic application. Therefore it is important to define the objective of the solution.

The main objective of the solution may be defined as interactive phishing detection (IPD). Any of MEP systems 500, 600, 700, and 800 may include an IPD module 4704 as part of TIM 400, as shown in FIG. 4B. The solution (e.g., implementation via IPD module 4704) does not attempt to prevent phishing, as that would require enumerating all the phishing attacks possible, which is practically impossible. Thus we further confine the scope of the solution as: A) enabling users to securely determine whether an application is authentic; and B) functionality of IPD is initiated by the end user who intends to verify the authenticity of the application. The restrictions A and B imply that the solution relies on the user's intention and invocation of IPD (e.g., via IPD module 4704 included in device management module 470) is not necessarily automatic. One example of a practical use of IPD is to assert the authenticity of an FSP payment engine, embedded in another application that requires payment functionality.

An embodiment of IPD may include two components: a client component (e.g., mobile phone 510) and a server component (e.g. TIM 400 including IPE module 4704). The client component resides on the target device (e.g., mobile phone 510, personal computer, laptop, mobile handset) that satisfies the following general requirements: 1) is network-aware; 2) is itself trustworthy; 3) contains a UI (user interface) element; 4) has a verification engine; 5) can be embedded or standalone; 6) its trustworthiness can be verified (i.e. can be authenticated).

The client component (e.g., mobile phone 510) is called a Trust Base, as it is able to establish and verify a trust claim (i.e. it is not tampered with). At a high-level and with the characteristics mentioned above, the Trust Base ensures that when an application is being executed and while it is obtaining users' credentials (and if the user chooses to) the authenticity of all the elements involved in the process can be verified. If this verification fails, then the user is notified via a visual indicator provided by the UI element, which in turn indicates a possible phishing attempt.

The server component (e.g. TIM 400 including IPD module 4704) is called a Trust Source as it generates verification material in a random manner that can be obtained by the client component, and also can be visually verified by the user. For example, the verification material can be a red, or other color or shading, button with a three-digit number in it forming an IPD visual indicator 1402, as seen in FIG. 14.

For the IPD visual indicator 1402 example, the button color and the numbers within it change randomly and periodically. This IPD visual indicator 1402 button is shown, for example, at a standard location on the Trust Source website (e.g., a website of the FSP 1310).

One implementation of IPD works as follows. When the user decides to verify whether the questionable software is authentic:
   1) User clicks on the verify button (available, e.g., on the UI component of the client 510);

2) Verify button forces the verification engine to authenticate the client 510 to the server 400;
3) Upon a successful authentication of the client 510 by the server 400:
   a) The client 510 verification engine retrieves the current color settings (for the button and the number) as well as the digit value of the IPD visual indicator 1402 from server 400;
   b) The UI component of the client 510 shows the button with the color setting and number of the IPD visual indicator 1402 retrieved by the client 510 verification engine.
4) User visits the Trust Source site (e.g. website of the FSP 1310) and verifies that the color and number of the IPD visual indicator 1402 shown by the verify button of the user's client 510 component is the same as the one displayed on the Trust Source site.

The server (e.g., TIM 400) component only responds to an authentic client (e.g., mobile phone 510) component, as there is an authentication step required by the server (e.g., TIM 400) to send any response. A rogue application would not be able to authenticate, and can only guess the correct combination of colors and numbers. Since this combination is randomly set on the server (e.g., TIM 400 of Trust Source website of the FSP 1310), and is also changing periodically, the window of opportunity for the rogue application is severely limited.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and/or cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, ROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received and/or stored in disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claim is:

1. A method, comprising:
   transmitting, by a mobile device to an authorization computing system, a request for provisioning of a payment instrument;
   receiving, by the mobile device from a trusted third party (TTP) system, over-the-air installation of the payment instrument in an embedded secure element (eSE) of the mobile device, wherein the mobile device receives the payment instrument for installation based on the TTP system receiving an approval notification from a financial service provider for funding of the payment instrument;
   scanning, by the mobile device from an electronic device, an identifier of wireless communication hardware of the electronic device;
   transmitting, by the mobile device to the authorization computing system, the identifier of the wireless communication hardware of the electronic device and a location of the mobile device at the time of scanning;
   receiving, by the mobile device from the authorization computing system based on the location of the mobile device at the time of scanning, location information of the electronic device;
   in response to the receiving, transmitting, by the mobile device to the authorization computing system, a request to authorize a transaction, wherein the request indicates that the electronic device is legitimate based on the location information of the electronic device; and
   receiving, by the mobile device from the electronic device, an authorization of the transaction indicating that the authorization computing system has verified that a location of the electronic device and the location of the mobile device at the time of scanning match, wherein authorization of the transaction is received from the authorization computing system based on the authorization computing system receiving an indication from the electronic device specifying that the identifier of the electronic device received by the electronic device from the mobile device has been verified by the electronic device.

2. The method of claim 1, wherein transmitting the request for provisioning the payment instrument on the mobile device includes transmitting a payment to the authorization computing system for an authenticated application at the mobile device, wherein the authenticated application provides for payment enablement on the mobile device.

3. The method of claim 2,
   wherein the electronic device is a payment terminal, and wherein the wireless communication hardware included in the payment terminal is a radio-frequency identification (RFID) tag that is readable by the mobile device prior to initiation of the transaction; and
   wherein the authorization computing system is a financial service provider (FSP) system that includes a trusted integrity manager (TIM) module.

4. The method of claim 1, further comprising:
   transmitting, by the mobile device to the authorization computing system, a request for provisioning of an additional payment instrument with the financial service provider; and
   receiving, by the mobile device from the trusted third party (TTP) system, over-the-air installation of the additional payment instrument in the eSE of the mobile device, wherein the installation is performed based on an approval notification received from the financial service provider for funding of the additional payment instrument.

5. The method of claim 1, in response to transmitting the request to authorize the transaction and prior to receiving the authorization of the transaction:
   receiving, by the mobile device from the authorization computing system, a request for biometric information, wherein the mobile device receives the request for biometric information from the authorization computing system based on the authorization computing system receiving the indication from the electronic device specifying that the identifier of the electronic device received by the electronic device from the mobile device has been verified by the electronic device; and
   transmitting, by the mobile device to the authorization computing system, biometric information obtained from a user of the mobile device, wherein the authorization of the transaction received by the mobile device from the electronic device is generated by the authorization computing system and transmitted to the electronic device prior to the electronic device transmitting the authorization to the mobile device, and wherein the authorization of the transaction is generated based on the authorization computing system verifying the mobile device by comparing the transmitted biometric information with previously stored biometric information of the user of the mobile device.

6. The method of claim 1, further comprising:
   receiving, by the mobile device from a carrier system, a subscriber identity module (SIM) identifier (ID), wherein the SIM ID activates service of the mobile device with the carrier system; and
   after receiving the SIM ID, transmitting, by the mobile device to the authorization computing system, a request for the mobile device to be payment enabled.

7. The method of claim 1, wherein the authorization of the transaction received by the mobile device is further received based on the authorization computing system verifying the electronic device prior to authorizing the transaction based on first data, wherein the first data is generated at the electronic device using a zero-knowledge proof authentication operation using a key stored in an eSE of the electronic device.

8. The method of claim 7, further comprising:
   transmitting, by the mobile device to the electronic device, the identifier of the electronic device scanned by the mobile device, wherein the identifier of the electronic device sent from the mobile device to the electronic device is verified by the electronic device using verification data generated by the authorization computing system, and wherein the verification data generated by the authorization computing system indicates verification of the identifier of the electronic device by the authorization computing system based on the first data.

9. An apparatus, comprising:
   one or more processors;
   wireless communication hardware; and
   one or more storage elements having program instructions stored thereon that are executable by the one or more processors and the wireless communication hardware to perform operations comprising:
      transmitting, to an authorization computing system, a request for provisioning of a payment instrument;
      receiving, from a trusted third party (TTP) system, over-the-air installation of the payment instrument in an embedded secure element (eSE) of the apparatus, wherein the apparatus receives the payment instrument for installation based on the TTP system receiving an approval notification from a financial service provider for funding of the payment instrument;

scanning, from an electronic device, an identifier of wireless communication hardware of the electronic device;

transmitting, to the authorization computing system, the identifier of the wireless communication hardware of the electronic device and a location of the apparatus at the time of scanning;

receiving, from the authorization computing system based on the location of the apparatus at the time of scanning, location information of the electronic device;

in response to the receiving, transmitting, to the authorization computing system, a request to authorize a transaction, wherein the request indicates that the electronic device is legitimate based on the location information of the electronic device; and receiving, from the electronic device, an authorization of the transaction indicating that the authorization computing system has verified the electronic device and the apparatus, wherein authorization of the transaction indicates that the authorization computing system has verified that a location of the electronic device indicated by the location information of the electronic device matches the location of the apparatus at the time of scanning, and wherein the authorization of the transaction is received from the authorization computing system based on the authorization computing system receiving an indication from the electronic device specifying that the identifier of the wireless communication hardware received by the electronic device from the apparatus has been verified by the electronic device.

10. The apparatus of claim 9,
wherein the electronic device is a payment terminal, and wherein the wireless communication hardware included in the payment terminal is a radio-frequency identification (RFID) tag that is readable by the apparatus prior to initiation of the transaction; and
wherein the authorization computing system is a financial service provider (FSP) system that includes a trusted integrity manager (TIM) module.

11. The apparatus of claim 9, wherein transmitting the request for provisioning the payment instrument on the apparatus includes transmitting a payment to the authorization computing system for an authenticated application at the apparatus, wherein the authenticated application provides for payment enablement on the apparatus.

12. The apparatus of claim 9, wherein the program instructions are further executable by the one or more processors and the wireless communication hardware to perform operations comprising:
transmitting, to the authorization computing system, a request for provisioning of an additional payment instrument with the financial service provider; and
receiving, from the trusted third party (TTP) system, over-the-air installation of the additional payment instrument in the eSE of the apparatus, wherein the installation is performed based on an approval notification received from the financial service provider for funding of the additional payment instrument.

13. The apparatus of claim 9, wherein the program instructions are further executable by the one or more processors and the wireless communication hardware to perform operations comprising:
transmitting, by the apparatus to the authorization computing system, a request for provisioning of a new payment instrument of another, different financial service provider; and
receiving, from the trusted third party (TTP) system, over-the-air installation of the new payment instrument in the eSE of the apparatus, wherein the apparatus replaces the payment instrument currently installed on the apparatus with the new payment instrument received from the TTP system by deleting the payment instrument currently installed on the apparatus and installing the new payment instrument in its place, and wherein the installation is performed based on an approval notification received from the different financial service provider for funding of the new payment instrument.

14. The apparatus of claim 9, wherein the identifier of the wireless communication hardware sent from the apparatus to the electronic device is verified by the electronic device using verification data generated by the authorization computing system.

15. A non-transitory computer-readable medium having instructions stored thereon that are executable by a mobile device to perform operations comprising:
transmitting, to an authorization computing system, a request for provisioning of a payment instrument;
receiving, from a trusted third party (TTP) system, over-the-air installation of the payment instrument in an embedded secure element (eSE) of the mobile device, wherein the mobile device receives the payment instrument for installation based on the TTP system receiving an approval notification from a financial service provider for funding of the payment instrument;
scanning, at a payment terminal, an identifier of wireless communication hardware of the payment terminal;
transmitting, to the authorization computing system, the identifier of the wireless communication hardware of the payment terminal and a location of the mobile device at the time of scanning;
receiving, from the authorization computing system based on the location of the mobile device at the time of scanning, location information of the payment terminal;
in response to the receiving, transmitting, to the authorization computing system, a request to authorize a transaction, wherein the request indicates that the payment terminal is legitimate based on the location information of the payment terminal; and
receiving, from the payment terminal, an authorization of the transaction indicating that the authorization computing system has verified that a location of the payment terminal indicated by the location information of the payment terminal and the location of the mobile device at the time of scanning match, wherein authorization of the transaction is received from the authorization computing system based on the authorization computing system receiving an indication from the payment terminal that the identifier of the wireless communication hardware received by the payment terminal from the mobile device has been verified by the payment terminal.

16. The non-transitory computer-readable medium of claim 15,
wherein the wireless communication hardware included in the payment terminal is a radio-frequency identification (RFID) tag that is readable by the mobile device prior to initiation of the transaction; and wherein the authorization computing system is a financial service provider (FSP) system that includes a trusted integrity manager (TIM) module.

17. The non-transitory computer-readable medium of claim 16, wherein the authorization of the transaction received by the mobile device is further received based on the authorization computing system verifying the payment terminal prior to authorizing the transaction based on first data, wherein the first data is generated at the payment terminal using a zero-knowledge proof authentication operation using a key stored in an eSE of the payment terminal.

18. The non-transitory computer-readable medium of claim 17, wherein after being generated at the payment terminal, the first data is transmitted from the payment terminal to the authorization computing system via a communication channel that provides mutual authentication between endpoints of each communication link in the communication channel, the first data being encrypted when communicated via the communication channel.

19. The non-transitory computer-readable medium of claim 15, wherein the operations further comprise:

transmitting, to the authorization computing system, a request for provisioning of an additional payment instrument with another, different financial service provider; and receiving, from the trusted third party (TTP) system, over-the-air installation of the additional payment instrument in the eSE of the mobile device, wherein the installation is performed based on an approval notification received from the different financial service provider for funding of the additional payment instrument.

20. The non-transitory computer-readable medium of claim 15, wherein the operations further comprise:

transmitting, by the mobile device to the authorization computing system, a request for provisioning of a new payment instrument of another, different financial service provider to replace the payment instrument currently installed on the mobile device; and receiving, from the trusted third party (TTP) system, over-the-air installation of the new payment instrument in the eSE of the mobile device, wherein the installation is performed based on an approval notification received from the different financial service provider for funding of the new payment instrument.

\* \* \* \* \*